US011188808B2

(12) United States Patent
Wang et al.

(10) Patent No.: US 11,188,808 B2
(45) Date of Patent: Nov. 30, 2021

(54) INDICATING A RESPONDING VIRTUAL ASSISTANT FROM A PLURALITY OF VIRTUAL ASSISTANTS

(71) Applicant: LENOVO (Singapore) PTE. LTD., New Tech Park (SG)

(72) Inventors: Song Wang, Cary, NC (US); Ming Qian, Cary, NC (US); Russell Speight VanBlon, Raleigh, NC (US); Yunming Wang, Buffalo Grove, IL (US)

(73) Assignee: LENOVO (Singapore) PTE. LTD., New Tech Park (SG)

( * ) Notice: Subject to any disclaimer, the term of this patent is extended or adjusted under 35 U.S.C. 154(b) by 1100 days.

(21) Appl. No.: 15/484,991

(22) Filed: Apr. 11, 2017

(65) Prior Publication Data
US 2018/0293484 A1  Oct. 11, 2018

(51) Int. Cl.
*G06N 3/00* (2006.01)
*G06F 16/632* (2019.01)
*G06F 16/638* (2019.01)
*G06F 3/16* (2006.01)

(52) U.S. Cl.
CPC ............. *G06N 3/006* (2013.01); *G06F 3/167* (2013.01); *G06F 16/632* (2019.01); *G06F 16/638* (2019.01)

(58) Field of Classification Search
CPC ..... G06N 3/006; G06F 16/638; G06F 16/632; G06F 3/167
See application file for complete search history.

(56) References Cited

U.S. PATENT DOCUMENTS

| 2014/0164953 | A1* | 6/2014 | Lynch | H04L 51/046 715/753 |
| 2014/0244712 | A1* | 8/2014 | Walters | G06F 3/167 709/202 |
| 2014/0365209 | A1* | 12/2014 | Evermann | G06F 40/35 704/9 |
| 2015/0186156 | A1* | 7/2015 | Brown | G06F 9/453 715/706 |
| 2018/0052664 | A1* | 2/2018 | Zhang | G06F 16/90332 |
| 2018/0121508 | A1* | 5/2018 | Halstvedt | G06F 16/3344 |
| 2018/0150571 | A1* | 5/2018 | Douglas | G06F 40/30 |

* cited by examiner

*Primary Examiner* — Kevin W Figueroa
(74) *Attorney, Agent, or Firm* — Kunzler Bean & Adamson; Bruce R. Needham

(57) ABSTRACT

A method for indicating a responding virtual assistant from one of a plurality of virtual assistants is disclosed. The method includes receiving a spoken query from a user of an electronic device. The method includes determining whether the spoken query addresses a particular one of a plurality of virtual assistants on the electronic device. The method includes polling a first set of the virtual assistants with the spoken query in response to the spoken query not addressing a particular one of the plurality of virtual assistants. The method further includes presenting a response to the spoken query with an indicator of a virtual assistant providing the response. An apparatus and computer program product are also disclosed, which perform the method.

20 Claims, 6 Drawing Sheets

INDICATING A RESPONDING VIRTUAL ASSISTANT FROM A PLURALITY OF VIRTUAL ASSISTANTS

FIELD

The subject matter disclosed herein relates to presenting a response from a virtual assistant and more particularly relates to presenting a response to a query and indicating a responding virtual assistant from one of a plurality of virtual assistants.

BACKGROUND

Description of the Related Art

Virtual assistants ("VAs") perform tasks and answer questions for a user based on spoken commands and queries. Numerous VAs exist today, including, Google Assistant, Amazon Alexa, Microsoft Cortana, and Apple Siri, to name a few of the popular ones. Many other VAs exist from third party vendors that target more specific tasks such as resolving calendar conflicts, chatbots with specific knowledge domain, etc. When a user makes a query in multi-virtual assistant system/environment, especially a generic question that is capable being answered by all VAs the response time can be long after polling for a response from each VA and deciding on which VA has the most appropriate (e.g., accurate) reply. In cases where the initial response from the first-choice VA does not satisfy the user, he or she may desire a second opinion from another VA, but may have difficulty doing so because it's not clear to the user which VA provided the initial response.

BRIEF SUMMARY

An apparatus for responding to a query in a multiple virtual assistant environment and indicating a responding virtual assistant from one of a plurality of virtual assistants is disclosed. A method and computer program product also perform the functions of the apparatus.

In one embodiment, the apparatus for presenting a response to a query and indicating a responding virtual assistant from one of a plurality of virtual assistants includes an audio input device, an output device, a processor, and a memory that stores code executable by the processor. Here the processor receives, via the audio input device, a spoken query from a user of an electronic device and determines whether the spoken query addresses a particular one of a plurality of virtual assistants on the electronic device. In response to the spoken query not addressing a particular one of the plurality of virtual assistants, the processor polls a first set of the virtual assistants with the spoken query. The processor also presents, via the output device, a response to the spoken query with an indicator of a virtual assistant providing the response.

In some embodiments, the processor further associates each of the plurality of virtual assistants on an electronic device to at least one of a plurality of information categories. The processor also identifies a query category for the spoken query. Here, the query category belongs to one of the plurality of information categories. In such embodiments, polling a first set of the virtual assistants with the spoken query includes the processor submitting the spoken query to each virtual assistant associated with an information category matching the query category.

In certain embodiments, the processor polls an addressed virtual assistant with the spoken query in response to the spoken query addressing a particular one of the plurality of virtual assistants. The processor may also poll at least one unaddressed virtual assistant matching the identified query category with the spoken query. The processor receives a first response from the addressed virtual assistant and presents the first response to the spoken query along with an indicator of the addressed virtual assistant.

In some embodiments, the processor receives an indication of the user being unsatisfied with the first response. In such embodiments, the processor presents a second response to the spoken query along with an indicator of the virtual assistant providing the second response. Here, the second response is received from a virtual assistant matching the identified query category with the spoken query, such as an unaddressed virtual assistant. In one embodiment, the indicator of a virtual assistant providing the response (e.g., first response and/or second response) is an audio indicator, a visual indicator, or a combination thereof.

In certain embodiments, the processor also determines whether one of the plurality of virtual assistants is a preferred virtual assistant for the information category matching the query category. In response to determining that one of the plurality of virtual assistants is a preferred virtual assistant for the matching information category, presenting a response to the spoken query may include the processor presenting a response received from the preferred virtual assistant for the information category.

In some embodiments, the processor receives a plurality of responses to the spoken query from the first set of the virtual assistants. In such embodiments, the presented response is a first response selected from the received plurality of responses. The processor may further receive an indication of the user being unsatisfied with the response and select an additional response from the received plurality of responses. The processor may then present the additional response along with an indicator of the virtual assistant providing the additional response. Here, the indicator of the virtual assistant providing the additional response may be one of an audio indicator, a visual indicator, or a combination thereof.

In certain embodiments, determining whether the spoken query addresses a particular one of a plurality of virtual assistants on the apparatus includes the processor receiving a list of trigger words associated with the plurality of virtual assistants. The processor also determines whether the spoken query a trigger includes a trigger word from the list of trigger words. Here, each trigger word corresponds to one of the plurality of virtual assistants.

In one embodiment, the method for presenting a response to a query and indicating a responding virtual assistant from one of a plurality of virtual assistants may include receiving, by use of a processor, a query from a user of an electronic device and determining whether the query addresses a particular one of a plurality of virtual assistants on the electronic device. The method includes polling a first set of the virtual assistants with the query in response to the query not addressing a particular one of the plurality of virtual assistants and presenting a response to the query with an indicator of a virtual assistant providing the response.

In certain embodiments, the method includes associating each of the plurality of virtual assistants on an electronic device to at least one of a plurality of information categories. The method may also include identifying a query category for the query, the query category being one of the plurality of information categories. In such embodiments, polling a first set of the virtual assistants with the query includes submitting the query to each virtual assistant associated with an information category matching the identified query category.

In some embodiments, the method includes polling an addressed virtual assistant with the query in response to the query addressing a particular one of the plurality of virtual assistants and polling at least one unaddressed virtual assistant matching the identified query category with the query. The method may also include receiving a first response to the query from the addressed virtual assistant and presenting the first response along with an indicator of the addressed virtual assistant.

In certain embodiments, the method includes receiving an indication of the user being unsatisfied with the first response. Here, the query may be a spoken query and the indication of the user being unsatisfied may be a verbal indication. The method further includes presenting a second response to the query along with an indicator of an unaddressed virtual assistant providing the response. In such embodiments, the second response is received from an unaddressed virtual assistant matching the identified query category with the query. Further, the indicator of a virtual assistant providing the response, the indicator of the addressed virtual assistant, and the indicator of an unaddressed virtual assistant providing the response may be an audio indicator, a visual indicator, or a combination thereof.

In some embodiments, the method includes determining whether one of the plurality of virtual assistants is a preferred virtual assistant for the information category matching the query category. In response to determining that one of the plurality of virtual assistants is a preferred virtual assistant for the matching information category, the method includes presenting a response to the query may include presenting a response received from the preferred virtual assistant for the information category.

In certain embodiments, the method includes receiving a plurality of responses to the query from the first set of the virtual assistants. In such embodiments, the presented response is a first response selected from the received plurality of responses. The method may include receiving an indication of the user being unsatisfied with the response and selecting an additional response from the received plurality of responses. The method further includes presenting the additional response with an indicator of an unaddressed virtual assistant providing the additional response. Here, the indicator of an unaddressed virtual assistant providing the additional response may be an audio indicator, a visual indicator, or a combination thereof.

In some embodiments, presenting a response to the query with an indicator of a virtual assistant providing the response includes receiving a plurality of responses to the query from the first set of the virtual assistants and determining a response quality score for each of the received plurality of responses. In such embodiments, the method also includes comparing each response quality score to a response quality threshold and selecting one of the plurality of responses having a response quality score above the response quality threshold.

In certain embodiments, selecting one of the plurality of responses having a response quality score above the response quality threshold includes selecting an earliest received response having a response quality score above the response quality threshold. In further embodiments, the method includes identifying a query category for the query and identifying, for each of the plurality of information categories, a virtual assistant from among the plurality of virtual assistants providing a highest number of responses having a response quality score above the response quality threshold. Here, the query category being one of the plurality of information categories. The method also includes designating, for each of the plurality of information categories, the identified virtual assistant as a preferred virtual assistant for that information category. In such embodiments, selecting one of the plurality of responses having a response quality score above the response quality threshold includes selecting a response received from the preferred virtual assistant for the information category matching the query category.

In one embodiment, the program product for presenting a response to a query and indicating a responding virtual assistant from one of a plurality of virtual assistants includes a computer readable storage medium that stores code executable by a processor. The executable code includes code to perform: providing a plurality of virtual assistants on an electronic device, receiving a query from a user of the electronic device, and determining whether the query addresses a particular one of the plurality of virtual assistants. The executable code also includes code to perform: polling a first set of the virtual assistants with the query in response to the query not addressing a particular one of the plurality of virtual assistants and presenting a response to the query with an indicator of a virtual assistant providing the response.

In certain embodiments, presenting a response to the query with an indicator of a virtual assistant providing the response includes receiving a plurality of responses to the query from the first set of the virtual assistants, determining a response quality score for each of the received plurality of responses, comparing each response quality score to a response quality threshold, and selecting one of the plurality of responses having a response quality score above the response quality threshold. The query may be a spoken query. In certain embodiments, selecting one of the plurality of responses having a response quality score above the response quality threshold includes selecting an earliest received response having a response quality score above the response quality threshold.

In some embodiments, the executable code also includes code to perform: identifying a query category for the spoken query, the query category being one of the plurality of information categories, identifying, for each of the plurality of information categories, a virtual assistant from among the plurality of virtual assistants providing a highest number of responses having a response quality score above the response quality threshold, and designating, for each of the plurality of information categories, the identified virtual assistant as a preferred virtual assistant for that information category. In such embodiments, selecting one of the plurality of responses having a response quality score above the response quality threshold includes selecting a response received from the preferred virtual assistant for the information category matching the query category.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
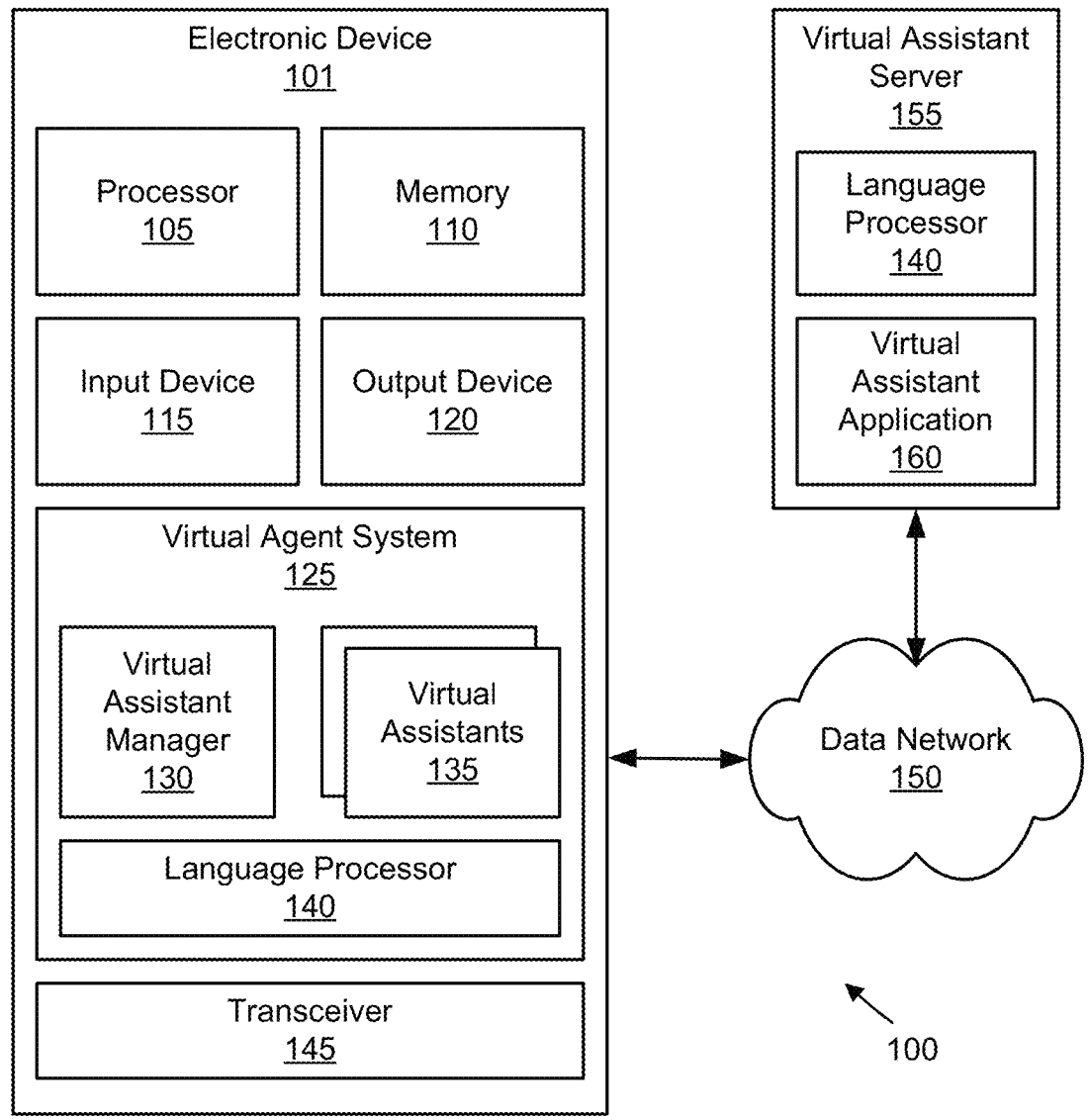
FIG. 1 is a schematic block diagram illustrating one embodiment of a system for responding to a query in a multiple virtual assistant environment and indicating a responding virtual assistant from one of a plurality of virtual assistants.

As will be appreciated by one skilled in the art, aspects of the embodiments may be embodied as a system, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random-access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages, including an object-oriented programming language such as Java, Smalltalk, C++ or the like and conventional procedural programming languages, such as the "C" programming language or similar programming languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. The code may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks. As used herein, a "computer" refers to any computing device capable of executing program code.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods, and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

Generally, the disclosed systems, apparatuses, methods, and computer program products manage multiple virtual assistants operating on the same electronic device by receiving a query from a user, determining whether the query addresses a particular one of the virtual assistants, selecting a first set of virtual assistants to poll with the query, selecting from a plurality of received responses, and presenting a response to a query along with an indicator of the responding virtual assistant. In a multiple virtual assistant system, there are several ways the user can query the system. If no specific virtual assistant is targeted for the query the system can either implement algorithm that automatically detect speech and analyze its contents to determine whether it's a query thereby triggering virtual assistants to respond. Another approach is to define a trigger keyword representative of the system but does not overlap with any virtual assistant's name. Lastly if a specific virtual assistant is targeted by the user he/she can use that system/user defined trigger word to wake up that virtual assistant.

When there is significant number of virtual assistant implemented by the system and the user has no preference as to which virtual assistant should provide the feedback, the system determines an information category in which the query falls and only polls virtual assistants belonging to that category, instead of polling all the available virtual assistants. The classification of virtual assistant to domain can be achieved either manually by the user or through rules set up by system.

The system selects a response (e.g., based on a response quality score) and presents it to the user along with an indicator of the responding virtual assistant. If user is not completely satisfied with the current response or wants addition information, then another virtual assistant's response can be requested. After a period of usage, the system can determine virtual assistant preference from past query history, for example which virtual assistant provided the most answers under each category/domain. The next time the user makes a query in the same domain, his/her preferred virtual assistant is polled first in order to provide a speedier response. The system can simultaneously poll the other virtual assistants in the query's information category in case user decides to make subsequent queries. This approach will reduce wait time from the user's perspective and make the multiple virtual assistant environment user friendly and less time consuming.

Even when the user queries a specific virtual assistant this does not necessarily mean that virtual assistant is capable of providing the best result. In such scenarios, the system may also send the query to other virtual assistants in the same category depending on the complexity of the query and the confidence level of the initial result, but the user specified virtual assistant's response is prioritized over the other responses.

FIG. 1 depicts a system 100 for presenting a response to a query and indicating a responding virtual assistant from one of a plurality of virtual assistants, according to embodiments of the disclosure. The system 100 includes an electronic device 101 having at least a processor 105, a memory 110, an input device 115, an output device 120, and a virtual agent system 125. In certain embodiments, the system 100 may also include at least one virtual assistant server 155 in communication with the electronic device 101 via a data network 150. In such embodiments, the electronic device 101 may include a transceiver 145 for communicating over the data network 150.

The electronic device 101 comprises a processor 105, a memory 110, an input device 115, an output device 120, and a virtual agent system 125. The virtual agent system 125 provides a virtual assistant manager 130 and a plurality of virtual assistants 135. In certain embodiments, the virtual agent system 125 also provides a language processor 140 that interprets user input (e.g., audio input) for a command or query directed to a virtual assistant, for example using natural language processing. In some embodiments, the electronic device 101 includes a transceiver 145 used to communicate over a communications network, such as the data network 150.

As used herein, a "virtual assistant" refers to a software agent that performs tasks for user of the electronic device 101. The specific tasks performed are based on user input (e.g., received via the input device 115) and access to applications and/or data located on the electronic device 101 or retrieved over the data network 150. Examples of tasks performed by virtual assistant include, but are not limited to, information retrieval, managing (e.g., creating, editing, and/or deleting) messages (e.g., emails, text messages, instant messaging), managing calendar items, file management, managing "to-do" lists, setting reminders/alarms, initiating communication (e.g., phone call, video call), launching applications, navigate to a network location (e.g., website), and the like. A virtual assistant may perform a task based on a voice command. For example, a virtual assistant may retrieve information to answer a spoken query, as discussed herein.

The electronic device 101 may include a body or an enclosure, with the components of the electronic device 101 being located within the enclosure. Additionally, the electronic device 101 may include a power source, for example a battery or a power adapter, that provides electrical power to components of the electronic device 101. In certain embodiments, the components of the electronic device 101 are communicatively coupled to each other, for example via a computer bus.

The processor 105, in one embodiment, may comprise any known controller capable of executing computer-readable instructions and/or capable of performing logical operations. For example, the processor 105 may be a microcontroller, a microprocessor, a central processing unit (CPU), a graphics processing unit (GPU), an auxiliary processing unit, a FPGA, or similar programmable controller. In some embodiments, the processor 105 executes instructions stored in the memory 110 to perform the methods and routines described herein. The processor 105 is communicatively coupled to the memory 110, the input device 115, the output device 120, the virtual agent system 125, and the transceiver 145. In certain embodiments, the processor 105 may perform the methods described herein.

The memory 110, in one embodiment, is a computer readable storage medium. In some embodiments, the memory 110 includes volatile computer storage media. For example, the memory 110 may include a random-access memory (RAM), including dynamic RAM (DRAM), synchronous dynamic RAM (SDRAM), and/or static RAM (SRAM). In some embodiments, the memory 110 includes non-volatile computer storage media. For example, the memory 110 may include a hard disk drive, a flash memory, or any other suitable non-volatile computer storage device. In some embodiments, the memory 110 includes both volatile and non-volatile computer storage media.

In some embodiments, the memory 110 stores data relating to presenting a response to a query and indicating a responding virtual assistant from one of a plurality of virtual assistants. For example, the memory 110 may store virtual assistants, messages, calendar events, queries, responses, quality scores, thresholds, user preferences, categories, and the like. In some embodiments, the memory 110 also stores program code and related data, such as an operating system operating on the electronic device 101. In one embodiment, the virtual agent system 125 may be embodied in a software application (or set of software applications) operating on the electronic device 101.

The input device 115, in one embodiment, may comprise any known computer input device including a touch panel, a button, a keyboard, a microphone, a camera, and the like. For example, the input device 115 may include a microphone or similar audio input device with which a user inputs sound or voice data (e.g., voice commands). In some embodiments, the input device 115 (or portion thereof) may be integrated with the output device 120, for example, as a touchscreen or similar touch-sensitive display. In some embodiments, the input device 115 comprises two or more different devices, such as a microphone and a touch panel. The input device 115 may include a camera for capturing images or otherwise inputting visual data.

The output device 120, in one embodiment, is configured to output visual, audible, and/or haptic signals. In some embodiments, the output device 120 includes an electronic display capable of outputting visual data to a user. For example, the output device 120 may include an LCD display, an LED display, an OLED display, a projector, or similar display device capable of outputting images, text, or the like to a user. In certain embodiments, the output device 120 includes one or more speakers for producing sound, such as an audible alert or notification. In some embodiments, the output device 120 includes one or more haptic devices for producing vibrations, motion, or other haptic output.

In some embodiments, all or portions of the output device 120 may be integrated with the input device 115. For example, the input device 115 and output device 120 may form a touchscreen or similar touch-sensitive display. As another example, the input device 115 and output device 120 may form a display that includes haptic response mechanisms. In other embodiments, the output device 120 may be located near the input device 115. For example, a camera, microphone, speakers, and touchscreen may all be located on a common surface of the electronic device 101. The output device 120 may receive instructions and/or data for output from the processor 105 and/or the virtual agent system 125. For example, the virtual agent system 125 may use the output device 120 to output a response to an input (e.g., spoken) query.

The virtual agent system 125, in one embodiment, is a software environment supporting the virtual assistant manager 130 and a plurality of virtual assistants 135. In certain embodiments, the virtual agent system 125 also includes a language processor 140 used to extract voice commands from input audio data. Throughout the description, the virtual agent system 125 is described as receiving and responding to voice commands, however in other embodiments the virtual agent system 125 may receive and respond to other forms of input commands.

The virtual agent system 125 may be comprised of computer hardware, computer software, or a combination of both computer hardware and computer software. For example, the virtual agent system 125 may include one or more integrated circuits specifically designed to support the virtual assistant manager 130, the virtual assistants 135, and/or the language processor 140. The virtual agent system 125 is discussed in further detail with reference to FIG. 2, below.

While depicted as a localized system, in certain embodiments, the virtual agent system 125 may be distributed system running on a plurality of devices including the electronic device 101. For example, the virtual agent system 125 may utilize computing resources from the virtual assistant server 155. As another example, the virtual agent system 125 may perform a task supported by at least one server application, such as the virtual assistant application 160. In yet another example, the virtual agent system 125 may access data on a networked server, such as the virtual assistant server 155.

The virtual assistant manager 130 manages multiple virtual assistants 135 present within the virtual agent system 125. In some embodiments, the virtual assistant manager 130 determines whether a particular user input is a command directed to a virtual assistant 135. For example, a particular user input may be a command (e.g., a query for information) directed to a virtual assistant 135 when the command addresses a specific virtual assistant 135, when the command addresses the electronic device 101, when a particular keyword is spoken, when a particular button is pressed, when particular gesture or movement is made, and the like. In certain embodiments, the virtual assistant manager 130 determines whether a voice command is directed to (e.g., addresses) a particular one of the multiple virtual assistants 135. Here, the virtual assistant manager 130 may access a list of trigger words (e.g., keywords) associated with specific virtual assistants 135. A trigger word may be the name of a virtual assistant 135, the name of a task to be performed by a specific virtual assistant 135, and the like.

In contrast, a voice command is not directed to a particular virtual assistant 135 when the user addresses the electronic device 101 or when the user does not speak a keyword associated with a particular virtual assistant 135, press a button associated with a particular virtual assistant 135, or make a gesture that is associated with a particular virtual assistant 135. Such a voice command is referred to herein as an unaddressed command (also, an unaddressed query). With the unaddressed command, the user is still requesting that a virtual assistant 135 on the electronic device perform a task, but the user does not specify which virtual assistant 135 should perform the task. In some embodiments, the user speaks an unaddressed command because the user is unaware which virtual assistants 135 are available or which virtual assistant 135 is best suited to perform the task. In other embodiments, the user speaks an unaddressed command or query because the user does not care which virtual assistant 135 responds to the command or query. Additionally, the user may have forgotten which virtual assistant 135 usually performs the task.

Upon determining that a query (e.g., a spoken query) does not address a particular virtual assistant 135, the virtual assistant manager 130 polls a first set of the virtual assistants 135 with the query. The first set of virtual assistant 135 includes at least one virtual assistant 135. In certain embodiments, the first set of virtual assistants 135 is less than the total number of virtual assistants 135 in the virtual agent system 125. Here, the virtual assistant manager 130 polls each virtual assistant 135 in the first set prior to presenting a response to the query. For example, the virtual assistant manager 130 may simultaneously (or sequentially) poll each virtual assistant 135 in the first set. In some embodiments, the virtual assistant manager 130 may identify a category for the query, wherein the first set of virtual assistants 135 includes only those virtual assistants 135 associated with the category.

For example, in response to the spoken query "What is the weather like today?" the virtual assistant manager 130 may determine the query's category to be "weather" and it may then poll only the virtual assistants 135 associated with the "weather" category. Here, weather-specific virtual assistants 135 and general-purpose (e.g., non-specialist) virtual assistants 135 may be included in the first set, but category specific (e.g., special-purpose) virtual assistants 135 not associated with the weather category (such as a dining-specific, sports-specific, or finance-specific virtual assistant 135) would be excluded from the first set. By doing so, the virtual assistant manager 130 improves response time in the multiple virtual assistant environment by only polling those virtual assistants 135 that are likely to provide an acceptable response.

In certain embodiments, the first set may be limited to only top (e.g., highest ranked) virtual assistants 135 in the identified category. This way, response time is improved when a large number of virtual assistants 135 are associated with a category. Here, the virtual assistant manager 130 may limit the first set to a predetermined number of virtual assistants 135, such as the top ten virtual assistants 135 in a given category. The top virtual assistants 135 may be identified via user input or feedback, from a third-party service, and/or from analyzing historical performance of the virtual assistants 135 in the category. In the latter situation, the virtual assistant manager 130 may initially poll a larger sized first set, gather a quality score for the response of each virtual assistant 135 in the initial first set, and pare down the first set to the predefined number of virtual assistants 135 after gathering sufficient quality score data. Determining a response quality score is described in further detail, below.

The virtual assistant manager 130 also presents, via the output device 120, a response to the query along with an indicator of a virtual assistant 135 providing the response. By identifying the responding virtual assistant 135 via the presented indicator, the user becomes aware of which virtual assistant 135 provides which responses. Thus, over time the user may develop a preference for certain virtual assistants 135, as discussed in further detail below. In one embodiment, the presented indicator may be a visual indicator (e.g., a logo, displayed word, color, pattern, etc.) associated with the virtual assistant 135. In another embodiment, the presented indicator may be an audible indicator (e.g., audio logo, chime, spoken name, etc.) associated with the virtual assistant 135. In certain embodiments, the presented indicator may be a combination of both audio and visual indicators.

As discussed above, the virtual assistant manager 130 associates each of the multiple virtual assistants 135 on an electronic device to at least one category. In certain embodiments, the virtual assistant manager 130 may assign a virtual assistant 135 to multiple categories. For example, a general-purpose virtual assistant 135 may be assigned to multiple (or even all) categories, while a special-purpose virtual assistant 135 (e.g., a calendar-specific virtual assistant 135) may be assigned to only one category. Additionally, the virtual assistant manager 130 may remove a virtual assistant 135 from a category after determining that the virtual assistant 135 does not provide acceptable answers (e.g., as determined by the quality score or user feedback) to queries in the category, or it otherwise ill-suited for the category. In further embodiments, the user may manually add or remove a virtual assistant 135 to/from a category.

In certain embodiments, the virtual assistant manager 130 also determines whether one of the plurality of virtual assistants 135 is a preferred virtual assistant 135 for each category. Where a category has a preferred virtual assistant 135, the virtual assistant manager 130 includes the preferred virtual assistant 135 in the polled set of virtual assistants (e.g., the first set discussed above). Further, where a category has a preferred virtual assistant 135, the virtual assistant manager 130 responds to the query by providing the response generated by the preferred virtual assistant 135 for the category to which the query belongs.

In one embodiment, the user designates a particular virtual assistant 135 as the preferred virtual assistant 135 for a category. In other embodiments, the virtual assistant manager 130 designates a particular virtual assistant 135 as the preferred virtual assistant for the category based on the quality scores and response times of the particular virtual assistant 135, as discussed below. In certain embodiments, a virtual assistant 135 becomes a candidate for the role of preferred virtual assistant for a category after providing a threshold number of acceptable responses to queries in that category. A response may be deemed to be "acceptable" if the quality score associated with response exceeds a threshold value.

In some embodiments, the user addresses a specific virtual assistant 135 with the command or query. For example, the user may speak the name of a specific virtual assistant 135, followed by the command or query. In such situations, the virtual assistant manager 130 passes the command or query to the addressed virtual assistant 135 (e.g., the virtual assistant manager 130 polls the addressed virtual assistant 135). The virtual assistant manager 130 may also poll at least one unaddressed virtual assistant 135 matching the category of the query, the addressed and unaddressed virtual assistants 135 forming a first set of virtual assistants. The virtual assistant manager 130 receives a first response to the query from the addressed virtual assistant 135 and presents the first response to the user while indicating that the response (e.g., first response) is from the addressed virtual assistant 135. Where additional virtual assistants 135 are polled, the virtual assistant manager 130 may receive a second response to the query (e.g., from an unaddressed virtual assistant 135) and present the second response and an indication of the responding virtual assistant 135, for example, if the user requests an additional response.

In some embodiments, the user may indicate a desire for another response to a spoken query. Here, the user may desire a second opinion or feel that a first provided response is not a correct or appropriate response to the query. For example, in response to the query "What is the best restaurant near me?" a first virtual assistant 135 may response with the name of a fast food restaurant, where the user does not consider fast food to be an appropriate response to the query. In certain embodiments, the user indicates the desire for another response by repeating the query. In one embodiment, the user may ask a follow up query, such as "What else?" or explicitly request a second opinion.

In response to the user indicating a desire for another response, the virtual assistant manager 130 presents a second response from another virtual assistant 135. The virtual assistant manager 130 presents the second response along with an indicator (audio and/or visual) of the responding virtual assistant 135. Where the user addressed the query to a specific virtual assistant 135, the second response is from an unaddressed virtual assistant 135.

Where the first set of virtual assistants 135 includes additional virtual assistants 135, the second response is selected from among the first set (e.g., virtual assistants 135 matching the query category). Recall that the virtual assistant manager 130 polls each virtual assistant 135 in the first set of virtual assistants 135 prior to presenting a response (e.g., the initial, unsatisfactory response). Accordingly, the virtual assistant manager 130 is able to immediately provide the second response without having to again poll the virtual assistants 135. Where there are no additional virtual assistants 135 in the first set, the virtual assistant manager 130 may poll one or more virtual assistants 135 from outside the first set. For example, the virtual assistant manager 130 may poll a general-purpose virtual assistant 135 not included in the first set. As another example, the virtual assistant manager 130 may poll a virtual assistant 135 associated with the query category, but not included in the first set.

In certain embodiments, the virtual assistant manager 130 obtains a response quality score ("RQS") for each response received from the polled virtual assistants 135 (e.g., from the first set). In one embodiment, each virtual assistant 135, when polled with a query, provides a RQS along with a response to the query. The RQS is a metric by which the likelihood of the response being satisfactory is predicted. The RQS may be based the accuracy of the response, for example as determined by a third-party (e.g., neither the user nor the provider of the virtual assistant 135). In certain embodiments, the RQS is derived from "big data" analysis, crowd-sourcing, from user feedback or history, or the like. The RQS is an objective measurement by which responses from different virtual assistants 135 may be compared.

The virtual assistant manager 130 uses the RQS to select a response to be presented to the user. Where the query is addressed to a specific virtual assistant 135, the virtual assistant manager 130 selects a backup response (e.g., a second, or subsequent, response). Where the query is not addressed to a specific virtual assistant 135, the virtual assistant manager 130 selects the first response (e.g., initial response) to the query based on the RQS. To avoid lengthy response times, the virtual assistant manager 130 may only give the virtual assistants 135 a certain amount of time to respond before it selects a response to be presented to the user. Further, the virtual assistant manager 130 may use the RQS to select any subsequent response.

In certain embodiments, the virtual assistant manager 130 selects the response to be presented to the user by comparing the RQS of each received response to a response quality threshold ("RQT"), and selecting the response to be presented from among only those responses having an RQS above the RQT. Where more than one or the received responses have an RQS above the RQT, the virtual assistant manager 130 may select an earliest received response having an RQS above the RQT. Alternatively, the virtual assistant manager 130 may select a response having the highest RQS, a response from a preferred virtual assistant 135, or a response from a highest ranked virtual assistant 135. In other embodiments, the virtual assistant manager 130 may simply present the first received response whose RQS exceeds the RQT.

In some embodiments, the virtual assistant manager 130 ranks each virtual assistant 135 associated with a category using the RQS of the responses provided by that virtual assistant 135. For example, the rankings may be based on an average RQS, a windowed average RQS, a weighted average RQS, an accumulated (e.g., total) RQS, or the like. The virtual assistant ranking maybe used to select the first set of virtual assistants 135, as discussed above.

Additionally, the virtual assistant manager 130 may identify, for each of the plurality of categories, a virtual assistant 135 from among the plurality of virtual assistants 135 that has provided a highest number of responses having an RQS above the RQT. The virtual assistant 135 that provides said highest number of responses may be designated as the preferred virtual assistant 135 for that category. Where multiple virtual assistants 135 provide the same highest number of responses, the virtual assistant manager 130 may additionally consider the virtual assistant ranking when selecting the preferred virtual assistant 135. Note that the user may override this selection of a preferred virtual assistant 135 by indicating a different preference through feedback or by manually selecting the preferred virtual assistant 135. As discussed above, if a preferred virtual assistant has been designated/selected for a category, then the virtual assistant manager 130 will select the response by the preferred virtual assistant as the response to be presented to the user.

The virtual assistants 135, in one embodiment, are software agents that perform the tasks, such as information retrieval, in response to user input. A virtual assistant 135, as used herein, may also be referred to as a virtual agent, an intelligent agent, an intelligent assistant, an intelligent personal assistant, or the like. Examples of virtual assistants include, but are not limited to, GOOGLE ASSISTANT™ (also referred to as GOOGLE NOW™), AMAZON ALEXA™, APPLE SIRI™, MICROSOFT CORTANA™, BLACKBERRY ASSISTANT™, IBM WATSON™, and the like. Certain virtual assistants are specialized for performing certain tasks or responding to certain categories of queries, while other virtual assistants may be generalized. The virtual assistants 135 respond to commands (e.g., voice commands) including queries (e.g., spoken queries) for information.

In certain embodiments, a virtual assistant 135 may include language processing algorithms. In such embodiments, the virtual assistant manager 130 may send a voice command to the virtual assistant 135, wherein the virtual assistant 135 uses its language processing algorithms to interpret the voice command. In other embodiments, the virtual assistant manager 130 and/or the language processor 140 may perform language processing on behalf of the virtual assistant 135.

The language processor 140, in one embodiment, is used to process natural language input by user. For example, the language processor 140 may use one or more language models along with stochastic, probabilistic, and/or statistical methods to resolve ambiguities in the user input. In certain embodiments, language processor 140 also recognizes speech, that is converts speech (e.g., audio data) into text or other information readily interpretable by computer. In one embodiment, language processor 140 extracts voice commands from input audio data. For example, the language processor 140 may perform speech recognition on the input audio data and determine whether the recognized language corresponds to a user command.

The transceiver 145, in one embodiment, is configured to send and to receive electronic communications via the data network 150. In certain embodiments, the transceiver 145 is a wireless transceiver capable of exchanging information via electromagnetic radiation (e.g., communication via radio frequencies, infrared, visible light, and the like) or sound (e.g., ultrasonic communication). In certain embodiments, the transceiver 145 is a wired transceiver capable of exchanging information via a transmission line (e.g., wire, data cable, or optical fiber).

The data network 150, in one embodiment, is a telecommunications network configured to allow the electronic device 101 to communicate with another device, such as the virtual assistant server 155. The data network 150 may be comprised of wired data links, wireless data links, and/or a combination of wired and wireless data links. Examples of wireless data networks include, but are not limited to, a wireless cellular network, a local wireless network, such as a Wi-Fi® network, a Bluetooth® network, a near-field communication (NFC) network, an ad hoc network, and/or the like. The data network 150 may include a wide area network (WAN), a storage area network (SAN), a local area network (LAN), an optical fiber network, the internet, or other digital communication network. In some embodiments, the data network 150 may include two or more networks. The data network 150 may include one or more servers, routers, switches, and/or other networking equipment. The data network 150 may also include computer readable storage media, such as a hard disk drive, an optical drive, non-volatile memory, random access memory (RAM), or the like.

The virtual assistant server 155, in one embodiment, supports one or more of the virtual assistants 135. In one embodiment, the virtual assistant server 155 includes one or more databases accessible by a virtual assistant 135 for responding to a query. In another embodiment, the virtual assistant server 155 may include computing resources usable by a virtual assistant 135 for responding to a query. In certain embodiments, a virtual assistant 135 performs a requested task using the virtual assistant server 155. As depicted, the virtual assistant server 155 may include a language processor 140 and at least one virtual assistant application 160.

The virtual assistant application 160, in one embodiment, provides server-functions for a client virtual assistant 135. Here, the virtual assistant 135 may be a software client that communicates with a virtual assistant application 160 to generate a response to the query. In certain embodiments, the virtual assistant server 155 and/or the virtual assistant application 160 provide a network-based (e.g., cloud-based) virtual assistant to the electronic device 101, such as via a client virtual assistant 135 running on the electronic device 101.

Figure 2:
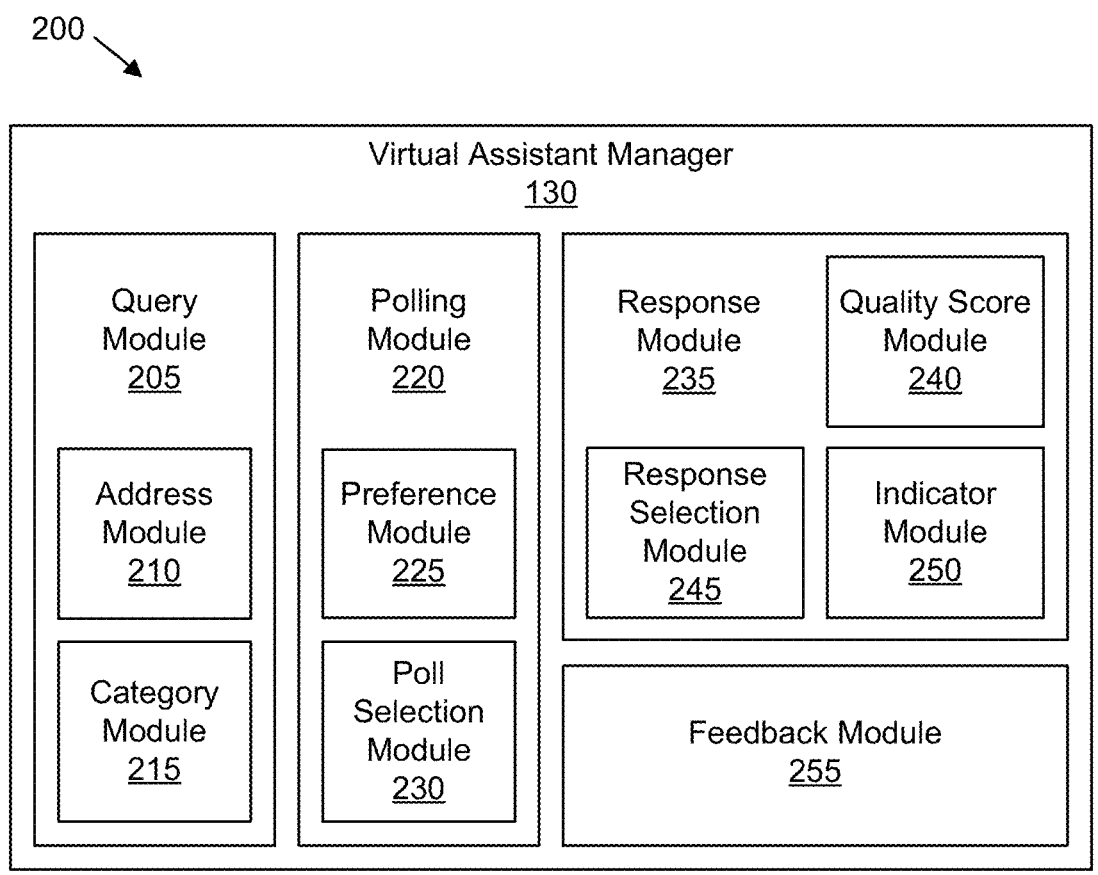
FIG. 2 is a schematic block diagram illustrating one embodiment of an apparatus for presenting a response to a query and indicating a responding virtual assistant from one of a plurality of virtual assistants.

FIG. 2 depicts a computing apparatus 200 for presenting a response to a query and indicating a responding virtual assistant from one of a plurality of virtual assistants, according to embodiments of the disclosure. In some embodiments, the computing apparatus 200 may include one embodiment of the virtual assistant manager 130 described above with reference to FIG. 1. In some embodiments, the computing apparatus 200 may be part of an electronic device, such as the electronic device 101. In other embodiments, computing apparatus 200 may include a processor and a memory which stores computer program code executable by the processor to implement the virtual assistant manager 130 will.

In general, the computing apparatus 200 receives a query from a user, determines whether the query addresses a particular one of a plurality of virtual assistants 135 (e.g., the plurality virtual assistants 135 being hosted by the computing apparatus 200), and polls a first set of the virtual assistants 135 with the query in response to the query not addressing a particular virtual assistant 135. The computing apparatus 200 further presents a response to the query and indicates which virtual assistant 135 provided the response. The computing apparatus 200 may include or be communicatively coupled to an input device through which the query is received and an output device through which the response is presented.

As depicted, the virtual assistant manager 130 may a plurality of modules, including a query module 205, a polling module 220, and a response module 235. The query module 205 may include one or more of an address module 210 and a category module 215. The polling module 220 may include one or more of a preference module 225 and a poll selection module 230. The response module 235 may include one or more of a quality score module 240, a response selection module 245, and an indicator module 250. In some embodiments, the virtual assistant manager 130 also includes a feedback module 255. The various modules within the computing apparatus 200 may be communicatively coupled to one another.

The query module 205, in one embodiment, is configured to receive a query from the user (e.g., the user of the electronic device 101). In one embodiment, the query module 205 is communicatively coupled to an input device, such as a microphone, through which the user inputs the query, such as a spoken query. In another embodiment, the query module 205 uses a listener or application programming interface ("API") to monitor for commands (e.g., voice commands) received at the computing apparatus 200. The query module 205 may be implemented using hardware circuitry, program code executed on the processor 105, or combinations thereof.

In some embodiments, the query module 205 automatically detects speech and analyzes its contents to determine whether the speech is a query. The query module 205 may then process (e.g., interpret) the received commands in order to determine whether the command represents a query from the user (e.g., a query for information). In certain embodiments, the query module 205 utilizes the language processor 140 to interpret the command (e.g., to determine whether a query). Additionally, the query module 205 may also utilize the language processor 140 to analyze the query, thereby obtaining query parameters usable by a virtual assistant 135 to respond to the query.

The query module 205 may determine whether the query addresses a particular one of a plurality virtual assistants 135 (e.g., located on the electronic device 101). As discussed above, certain keywords, such as a virtual assistant name, may be associated with the virtual assistants 135. Additionally, the query module 205 may classify the query into one or more query categories. In the depicted embodiment, the query module 205 includes an address module 210 and a category module 215.

The address module 210 determines whether the query (e.g., a spoken query) addresses a particular one of a plurality virtual assistants 135 present on a device. The address module 210 may indicate to the polling module 220 whether the query addresses a particular virtual assistant 135, wherein the polling module 220 selects a virtual assistant 135 to respond to the query based on the indication. The address module 210 may be implemented using hardware circuitry, program code executed on the processor 105, or combinations thereof. While depicted as a component of the query module 205, in certain embodiments the address module 210 may be a separate module within the virtual assistant manager 130.

In one embodiment, the address module 210 may determine whether the query includes a trigger word (keyword) associated with a particular one of the plurality of virtual assistants 135. The address module 210 (or the query module 205) may receive a list of trigger words associated with the virtual assistants 135. For example, the address module 210 (or the query module 205) may retrieve the list from memory (e.g., memory 110) or receive it from the virtual assistant server 155. As discussed above, the trigger word may be the name (or a part of a name) of a particular virtual assistant 135. The user may address (e.g., target) a specific virtual assistant 135 by utilizing that virtual assistant's name or trigger word to wake up the virtual assistant 135.

In another embodiment, the address module 210 may determine whether the query is addressed to the device in general, or simply does not address any device or virtual assistant. Here, one or more trigger words may be defined that are representative of the electronic device 101 and/or the virtual agent system 125 and do not overlap with any names or trigger words belonging to a virtual assistant 135. In certain embodiments, the address module 210 may cooperate with a language processor 140 to determine whether a query addresses a particular virtual assistant 135. For example, the language processor 140 may be utilized to determine whether an instance of a trigger word indicates that a particular virtual assistant 135 is being addressed, for example using context of the user command, location of the trigger word within the query, and the like.

The category module 215, in one embodiment, is configured to identify a query category for the received query. The query category may also be referred to herein as an "information category." For example, the category module 215 may determine a query category from among a plurality of candidate categories. These candidate categories may be preconfigured and/or may be received from the virtual assistant server 155. Each category encompasses a "domain" of information. Examples of information categories include, but are not limited to, food, entertainment, maps (or navigation), weather, calendar, and the like.

In certain embodiments, the category module 215 cooperates with a language processor 140 to identify a query category for the received query. For example, the category module 215 may operate of keywords, phrasing, and/or natural language processing to identify the query category. Upon determining a query category, the category module 215 may provide the identified query category to the polling module 220. Here, the polling module 220 selects at least one virtual assistants 135 belonging to the same information category as the query for polling.

In some embodiments, the category module 215 associates each of the virtual assistants 135 with an information category. Each of the virtual assistants 135 may be associated with at least one of the information categories. For example, a special-purpose virtual assistant 135 (e.g., one customized for specific information category) may be assigned only one information category, while a general-purpose virtual assistant 135 may be assigned to more than one information category. A virtual assistant 135 may be associated with a particular category based on a description of the virtual assistant 135, by request of the virtual assistant 135, based on the accuracy and/or acceptability of responses provided by the virtual assistant 135 (e.g., as determined using a response quality score, discussed below), by instructions from third party (e.g., the virtual assistant server 155), and the like. In certain embodiments, the user may manually indicate to the category module 215 which of the virtual assistants 135 is to be associated with each information category.

Where the information categories are predefined, a list of the predefined information categories may also include listings of virtual assistants 135 belonging to each predefined information category. Here, some virtual assistants 135 and the list may not be installed/present on the electronic device 101, therefore the category module 215 may assign each virtual assistant 135 installed/present on the electronic device 101 to an information category. The category module 215 may store the associations of virtual assistants 135 to information categories in the memory 110. The category module 215 may be implemented using hardware circuitry, program code executed on the processor 105, or combinations thereof. While depicted as a component of the query module 205, in certain embodiments the category module 215 may be a separate module within the virtual assistant manager 130.

The polling module 220 polls one or more virtual assistants 135 with the received query. As used herein, polling a virtual assistant 135 refers to submitting the received query to the virtual assistant 135 (or, alternatively, providing the virtual assistant 135 with query parameters after processing the query to derive said query parameters) and awaiting a response to the query. In some embodiments, polling a virtual assistant 135 includes bringing the virtual assistant 135 into a "wake" or "active" state. Here, the multiple virtual assistants 135 may be placed in an inactive state when not receiving a query or processing the query to provide a response.

Where the received query addresses a particular virtual assistant 135, the polling module 220 polls at least the addressed virtual assistant for a response to the query. Where the received query does not address a particular virtual assistant 135, the polling module 220 polls the first set of the virtual assistants 135 for a response to the query. In the depicted embodiments, the polling module 220 includes a poll selection module 230 for selecting a subset of the multiple virtual assistants 135 to poll for responses to the query.

In certain embodiments, the user may have a preferred virtual assistant 135 for queries belonging to certain information categories (alternatively, the virtual assistant manager 130 may designate a particular virtual assistant 135 to be the preferred virtual assistant 135 for an information category). Where a preferred virtual assistant 135 exists for the query category, the polling module 220 polls the preferred virtual assistant 135. In the depicted embodiments, the polling module 220 includes a preference module 225 for identifying a preferred virtual assistant 135.

Where the user does not have a preference as to which virtual assistant 135 should respond to the query (e.g., the user does not address a specific virtual assistant 135 and no preferred virtual assistant 135 is defined for the category to which the query belongs), then the polling module 220 only polls virtual assistants 135 associated with an information category of the query. In certain embodiments, the polling module 220 polls the first virtual assistant 135 in the first set and waits until the response module 235 presents the received response before polling the other virtual assistants 135 in the first set (e.g., simultaneously or sequentially). Beneficially, this approach reduces wait time from the user's perspective and minimizes the impact on the computer resources of the electronic device 101. In other embodiments, the polling module 220 simultaneously polls all the virtual assistants 135 in the first set. The polling module 220 may be implemented using hardware circuitry, program code executed on the processor 105, and combinations thereof.

The preference module 225 identifies a preferred virtual assistant 135. As discussed above, a query may be associated with one of the plurality of information categories. For each category, the preference module 225 may determine whether the user has a preferred virtual assistant 135. In certain embodiments, the preference module 225 indicates the preferred virtual assistant 135 to the poll selection module 230, wherein the poll selection module 230 selects at least the preferred virtual assistant 135 to poll for a response to the query.

In certain embodiments, the preference module 225 designates a particular virtual assistant 135 as the preferred virtual assistant for a particular information category. In one embodiment, after a period of usage, the preference module 225 determines from past query history which virtual assistant 135 provided the most answers under each information category. From the history, the preference module 225 may identify a virtual assistant 135 providing a highest number of responses with a response quality score ("RQS") above a response quality threshold ("RQT"). Here, the preference module 225 designates the virtual assistant 135 that provides size number of responses above the RQT as the preferred virtual assistant 135 for that information category. In certain embodiments, a virtual assistant 135 must provide a threshold number of responses above the RQT before it can be designated as the preferred virtual assistant 135. In other embodiments, the preference module 225 designates a particular virtual assistant 135 as the preferred virtual assistant 135 for a category based on user input/feedback.

In some embodiments, the preference module 225 periodically reviews the selection of a preferred virtual assistant 135 and updates which virtual assistant 135 is designated the preferred virtual assistant based on the number of responses a virtual assistant 135 provides that have an RQS above the RQT.

The preference module 225 may be implemented using hardware circuitry, program code executed on the processor 105, or accommodations thereof. While depicted as a component of the polling module 220, in certain embodiments the preference module 225 may be a separate module within the virtual assistant manager 130.

The poll selection module 230, in one embodiment, is configured to select one or more virtual assistants 135 for polling with the query. The poll selection module 230 submits its selection to the polling module 220, wherein the polling module 220 submits the query only to the selected virtual assistants 135. Where the received query addresses a particular virtual assistant 135, the poll selection module 230 selects the addressed virtual assistant for a response to the query. The poll selection module 230 may additionally select at least one unaddressed virtual assistant 135 matching the category of the query. Here, the addressed and unaddressed virtual assistants 135 form a first set of virtual assistants, wherein the polling module 220 polls the first set of virtual assistants 135 for a response to the query.

Where the received query does not address a particular virtual assistant 135, the poll selection module 230 selects a first set of the virtual assistants 135 based on the query category. Where the category module 215 identifies an information category to which the query belongs, the poll selection module 230 selects only virtual assistants 135 that also belong to (e.g., are associated with) the identified category. Where the category module 215 does not identify an information category (alternatively, where the identified category is "unknown" or "indeterminate"), then the poll selection module 230 may select only general-purpose virtual assistants 135. Here, the selected virtual assistants 135 form a first set of virtual assistants, wherein the polling module 220 polls the first set of virtual assistants 135 for a response to the query.

Where the identified information category has a preferred virtual assistant 135, the poll selection module 230 includes the preferred virtual assistant 135 in the first set. As noted above, the first set of virtual assistants 135 may be limited to a certain number of virtual assistants 135 in order to improve response times. The poll selection module 230 may be implemented using hardware circuitry, program code executed on the processor 105, or combinations thereof. While depicted as a component of the query module 205, in certain embodiments the poll selection module 230 may be a component of the polling module 220 or may be a separate module within the virtual assistant manager 130.

The response module 235 is configured to present (e.g., by controlling the output device 120) a response to the query. The response module 235 also presents, with each response, an indicator of the virtual assistant 135 providing the response (the "responding virtual assistant"). As discussed above, presenting the indicator allows the user to associate the responses with a particular virtual assistant 135. Having knowledge of which virtual assistant 135 provides which answer, the user may develop preferences for certain virtual assistants 135. The response module 235 reasons at least a first response to the query. In some embodiments, the response module 235 also presents a second response, third response, etc. in response to the user being unsatisfied with the first response. Where additional responses are presented, the response module 235 also indicates the responding virtual assistants 135 associated with the additional responses.

In certain embodiments, the response module 235 receives a plurality of responses from the polled virtual assistants 135. The response module 235 may then select a first response, retrieve an indicator of the responding virtual assistant (e.g., the virtual assistant 135 whose response was selected), and present both the response and the indicator. In certain embodiments, the first response is selected based on a response quality score. In the depicted embodiment, the response module 235 includes a quality score module 240, a response selection module 245, and an indicator module 250. The response module 235 may be implemented using hardware circuitry, program code executed on the processor 105, or combinations thereof.

The quality score module 240 is configured to determine a response quality score ("RQD") for each response to the query received at the response module 235. In certain embodiments, a responding virtual assistant 135 provides the RQS for the response. As discussed above, the RQS may be assigned using various algorithms that predict the accuracy of the response and the likelihood the response will be found acceptable by the user. The RQS may be determined by a service provider associated with the virtual assistant 135 or by a third party, such as a third-party service provider utilizing big data analysis and/or crowdsourcing. In certain embodiments, the quality score module 240 receives the RQS associated with response through an API.

In certain embodiments, the quality score module 240 identifies a response quality threshold ("RQT") and compares the RQS of each received response to the RQT. In one embodiment, the response selection module 245 only selects those responses whose RQS meets or exceeds the RQT. In another embodiment, the quality score module 240 may filter the received responses to eliminate those whose RQS is below the RQT, so that response selection module 245 cannot select a response with an RQS below the RQT. In certain embodiments, the RQT is the same for all information categories. In other embodiments, different information categories may be associated with different RQTs.

In some embodiments, the quality score module 240 may reevaluate the original RQS for a received response. For example, where multiple polled virtual assistants 135 provide similar results (including identical or near-identical results), the quality score module 240 may reevaluate the original RQS for the similar results to give an improved RQS. As another example, where a polled virtual assistant 135 provides a result vastly different result than others of the polled virtual assistants 135, the quality score module 240 may reevaluate the original RQS for the dissimilar result to give a worsened RQS.

Alternatively, the quality score module 240 may give an increased weight to the RQS of a response very similar to another response and a decreased weight to the RQS of a very dissimilar response. In certain embodiments, the quality score module 240 utilizes the language processor 140 to evaluate the degree of similarity. Here, a degree of similarity may be expressed as a percentage, with percentages in the first range deemed to be "very similar" (e.g., identical or near identical) meriting improved RQS (or increased weight) and a second range deemed to be "very dissimilar" meriting worsened RQS (or decreased weight), with responses not in the first range or second range not being reevaluated/reweighed.

In one embodiment, the first response may combine responses for multiple virtual assistants 135 where the responses are dissimilar (e.g., different), but having high RQS. The quality score module 240 may be implemented using hardware circuitry, program code executed on the processor 105, or combinations thereof. While depicted as a component of the response module 235, in other embodiments the quality score module 240 may be a separate module within the virtual assistant manager 130.

The response selection module 245 is configured to select a response to the query for presenting to the user. As discussed above, the response module 235 may receive a plurality of responses from the polled virtual assistants 135. The response selection module 245 selects a first response from the received responses, wherein the response module 235 presents the first response to the user along with an indication of the responding virtual assistant (e.g., the virtual assistant that provided the first response). Additionally, the response selection module 245 may select one or more additional responses, for example prior to the response module 235 presenting the first response. The response selection module 245 may be implemented using hardware circuitry, program code executed on the processor 105, or combinations thereof. While depicted as a component of the response module 235, in other embodiments the response selection module 245 may be a separate module within the virtual assistant manager 130.

Where the query is addressed to a specific virtual assistant 135, the response selection module 245 selects the response provided by the addressed virtual assistant 135 to be the first response. Where the query does not address a specific virtual assistant 135 at a preferred virtual assistant exists for the information category to which the query belongs, the response selection module 245 selects the response provided by the preferred virtual assistant to be the first response. In other scenarios, the response selection module 245 may use the RQS to select the first response.

As discussed above, the response selection module 245 may select a response from among those responses having an RQS above the RQT. In certain embodiments, the response selection module 245 ignores any responses not having an RQS above the RQT. In one embodiment, the response selection module 245 selects, as the first response, and earliest received response having an RQS above the RQT. Here, the response module 235 may continue to receive responses from polled virtual assistants (e.g., in preparation for subsequent responses) while present the first response, in order to minimize response time at the possible sacrifice of response quality. In another embodiment, the response selection module 245 selects, from those responses having an RQS above the RQT, a response with the highest RQS or from a highest ranked virtual assistant 135 to be the first response. Further, if no response has an RQS that exceeds the RQT, then the response selection module 245 may select a response having the highest RQS to be the first response.

In response to the user desiring an additional response to the query, the response selection module 245 may select a second response from among those responses received from the polled virtual assistants 135 (excluding the first response). Where an addressed virtual assistant 135 provides the first response, the response selection module 245 may select a response provided by a preferred virtual assistant as the second response. Otherwise, the response selection module 245 selects the second response based on RQS, as described above. In response to the user desiring a third response, fourth response, etc., the response selection module 245 may select additional responses based on RQS. Generally, any additional response will be selected from a virtual assistant 135 classified in the same information category as the query.

The indicator module 250 is configured to retrieve an indicator of the responding virtual assistant. The indicator may be an audio indicator, a visual indicator, or combinations thereof. Examples of indicators include, but are not limited to, logos, icons, virtual assistant names, and chimes, jingles, sounds, colors, patterns, and like associated with virtual assistant. The indicator module 250 may retrieve the indicator in response to receiving an identification of the responding virtual assistant from the response selection module 245. In one embodiment, the response presented to the user may be an audio format (e.g., a voiced response), while presented indicator is in a visual format (e.g., an icon or logo). In another embodiment, the indicator is a speech indicator where the virtual assistant's name or audio logo is appended to the voiced response.

In some embodiments, the response to the query may incorporate results for multiple virtual assistants 135. Here, the indicator indicates that multiple virtual assistants 135 are responding alternatively, the indicator may include individual indicators from all responding virtual assistants 135. In certain embodiments, the indicator module 250 retrieves the indicator from the memory 110. In other embodiments, the indicator module 250 may retrieve the indicator from a remote location, such as a remote server or database. The indicator module 250 may be implemented using hardware circuitry, program code executed on the processor 105, or combinations thereof. While depicted as a component of the response module 235, in other embodiments the indicator module 250 may be a separate module within the virtual assistant manager 130.

The feedback module 255, in one embodiment, is configured to receive and interpret feedback from the user. In certain embodiments, the feedback may be audio (e.g., spoken) feedback. In other embodiments, the user feedback may be tactile (e.g., a button press or gesture on a touchscreen), visual (e.g., making a hand or finger gesture to a camera), motion (e.g., moving the electronic device 101 in a particular manner), or the like. In some embodiments, the feedback module 255 cooperates with the language processor 140 to interpret the user feedback (e.g., using natural language processing services of the language processor 140). The feedback module 255 may be implemented using hardware circuitry, program code executed on the processor 105, or combinations thereof.

The feedback module 255 determines whether the user is unsatisfied with the first (or a subsequent) response. For example, the user may vocally indicate that he/she is satisfied or unsatisfied with a response, that the user would like a second opinion, and/or may provide a follow-up question/query with additional parameters. In response to determining that the user is unsatisfied with a presented response, the feedback module 255 signals the response module 235 to present another response to the user.

In one embodiment, the feedback module 255 may compare the user feedback with a list of keywords to determine whether the user is satisfied or unsatisfied with a presented response. As a non-limiting example, certain keywords such as "Got it," "Okay," and "Thanks" may be associated with user satisfaction with the response, while other keywords such as "What else" and "Another" may be associated with user dissatisfaction with the response. As discussed above, the language processor 140 may aid the feedback module in interpreting more complex phrases in the user feedback. If no further query (or additional response) is requested in response to the response module 235 presenting the first response, and the feedback module 255 determines that the first response is acceptable to the user (e.g., the user satisfied with the first response).

In some embodiments, the feedback module 255 identifies the primary feedback provider for the query. Here, the virtual assistant 135 writing the first response is considered the primary feedback provider if the user indicates (e.g., either explicitly or tacitly) that he/she is satisfied with the first response. Where the response module 235 provides subsequent responses, the feedback module 255 may interact with the user (e.g., via prompts) to identify which response was most acceptable. Here, the virtual assistant 135 that provided the most acceptable response is considered the primary feedback provider. The primary feedback later then be used to rank (e.g., prioritize) the virtual assistants 135 associated with the query's information category. In one embodiment, the poll selection module 230 uses the primary feedback provider data to select the first set of virtual assistants 135 to poll with the query. In another embodiment, the response selection module 245 uses the primary feedback provider data to select response to present to the user.

In certain embodiments, the feedback module 255 determines, from the user feedback, that the user desires to designate a particular virtual assistant 135 as a preferred virtual assistant 135 for a particular information category. In response, the feedback module 255 signals the preference module 225 to place the particular virtual assistant 135 in the role of preferred virtual assistant for that information category. In another embodiment, the feedback module 255 determines, from the user feedback, that the user desires to remove a particular virtual assistant 135 from the role of preferred virtual assistant for a particular information category. Again, the feedback module 255 signals the preference module 225 which then removes the indicated virtual assistant 135 from the role. The preference module 225 may immediately place another virtual assistant 135 into the role of preferred virtual assistant, using the criteria described above, or wait a predetermined amount of time before designating a new preferred virtual assistant.

Figure 3:
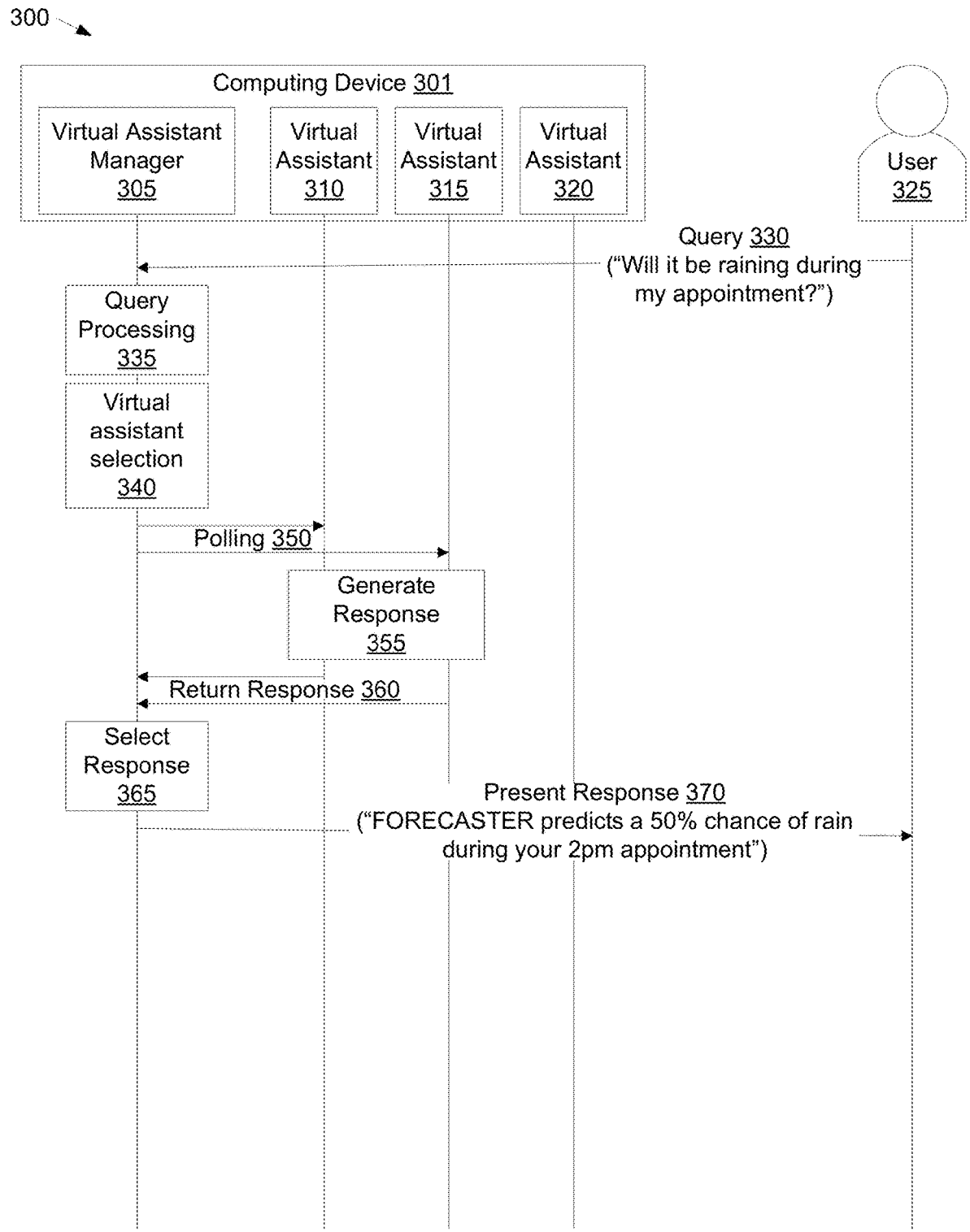
FIG. 3 is a diagram illustrating a first example of a computing device presenting a response to a query and indicating a responding virtual assistant from one of a plurality of virtual assistants.

FIG. 3 depicts a first scenario 300 of a computing device 301 presenting a response to a query from a user 325 while indicating a responding virtual assistant from one of a plurality of virtual assistants 310-320, according to embodiments of the disclosure. The computing device 301 may be one embodiment of the electronic device 101. The computing device 301 includes a virtual assistant manager 305, a first virtual assistant 310, a second virtual assistant 315, and a third virtual assistant 320. The virtual assistant manager 305 may be one embodiment of the virtual assistant manager 130 and the virtual assistants 310-320 may be embodiments of the virtual assistants 135, described above. While only three virtual assistants are shown in this Figure, in other embodiments the computing device 301 includes another number of virtual assistants.

As depicted, in the first scenario 300 the user 325 voices a query 330 ("Will it be raining during my appointment?") to the computing device 301. Here, the query 330 is a request for information that does not address a specific virtual assistant. In some embodiments, the user may address the computing device 301 when voicing the query 330 (e.g., "Phone, will it be raining during my appointment?", when the electronic device 101 is a mobile phone).

The virtual assistant manager 305 processes 335 the spoken query, for example using natural language processing. In one embodiment, the computing device 301 includes language processing engine, such as the language processor 140, used to processes 335 the spoken query. When processing 335 the query, the virtual assistant manager 305 determines that the query 330 does not address a specific virtual assistant. Further, the virtual assistant manager 305 identifies an information category (e.g., weather) to which the query 330 pertains.

Note that the query 330 requires knowledge of the user's calendar in order to answer the spoken question. In one embodiment, the virtual assistant manager 305 accesses the user's calendar in order to determine when the appointment is. In some embodiments, advanced processing may be needed to determine which of a plurality of appointments the user is referring to. Still further, the virtual assistant manager 305 may prompt the user 325 for clarifying details needed to identify the specific appointment the user is referring to. For example, the virtual assistant manager 305 may control an output device (e.g., speaker) of the computing device 301 to voice the prompt "Are you referring to today's dentist appointment at 2 PM?"

Having processed the query, the virtual assistant manager 305 proceeds to select 340 a first set of virtual assistants (e.g., from the virtual assistants 310-320) to be polled with the query. Here, the virtual assistant manager 305 selects 340 the first virtual assistant 310 and the second virtual assistant 315. Virtual assistant selection 340 may be as described above, e.g., based on the identified category, preferred virtual assistants, and the like. In certain embodiments, the virtual assistant manager 305 only selects virtual assistants that have access to the user's calendar, in order for them to determine times associated with the user's request.

Having selected the first set of virtual assistants, the virtual assistant manager 305 polls 345 each virtual assistant in the first set. Here, the virtual assistant manager 305 polls 345 the first virtual assistant 310 and the second virtual assistant 315. Where the selected virtual assistants do not have access to the user's calendar, the virtual assistant manager 305 accesses the user's calendar and provides the times associated with the user's request to the selected virtual assistants in the poll. The polled virtual assistants 310-315 then generate 350 responses to the query 330 and return 355 them to the virtual assistant manager 305.

The virtual assistant manager 305 receives responses from the polled virtual assistants 310-315 and proceeds to select 360 a first response to be presented to the user. Response selection 360 may be as described above, e.g., based on a response quality score, preferred virtual assistants, and the like. Here, the virtual assistant manager 305 selects 360 the response ("there is a 50% change of rain during your 2 pm dentist appointment") from a virtual assistant named "FORECASTER," which may be one of the first virtual assistant 310 and the second virtual assistant 315.

Having selected the first response, the virtual assistant manager 305 controls an output device (e.g., speaker) of the computing device 301 to present 365 the first response along with an indicator of the responding virtual assistant. Here, the computing device 301 presents to the user 325 "FORECASTER says there is a 50% chance of rain during your 2pm dentist appointment." Here, the indicator of the responding virtual assistant is the verbal indicator "FORECASTER says." In one embodiment, an audio logo may also be played as part of the indicator. In other embodiments, the virtual assistant manager 305 may control a display of the computing device 301 to display a name, logo, color, pattern, etc. associated with the virtual assistant "FORECASTER."

Figure 4:
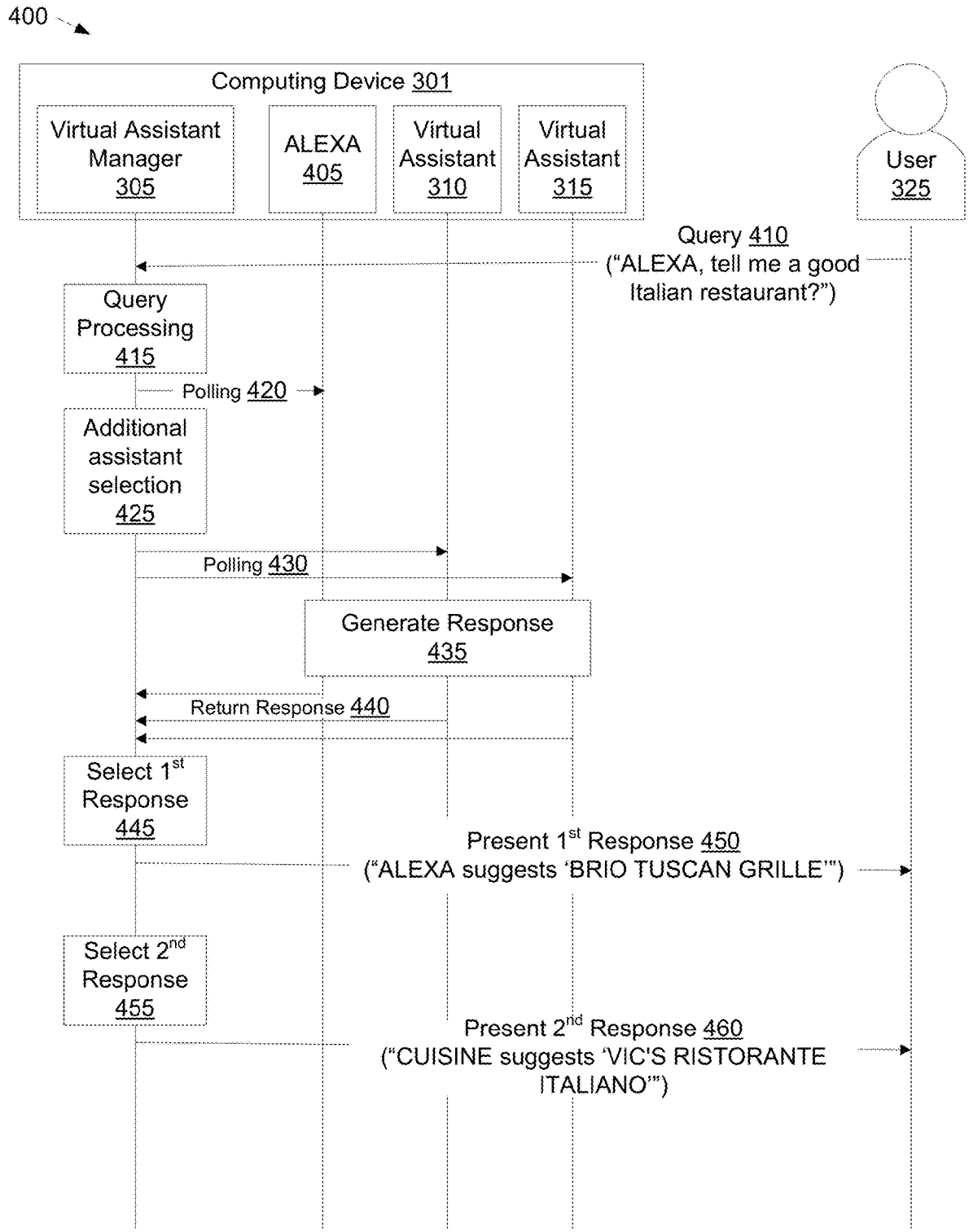
FIG. 4 is a diagram illustrating a second example of a computing device presenting a response to a query and indicating a responding virtual assistant from one of a plurality of virtual assistants.

FIG. 4 depicts a second scenario 400 of the computing device 301 presenting a response to a query and indicating a responding virtual assistant from one of a plurality of virtual assistants, according to embodiments of the disclosure. Here, the computing device 301 includes the virtual assistant manager 305, a virtual assistant 405 named "Alex," and the first and second virtual assistants 310-315. In the second scenario 400 the user 325 voices a query 410 ("Alex, tell me a good Italian restaurant") to the computing device 301. Here, the query 410 is a request for information that addresses a specific virtual assistant (e.g., the virtual assistant "Alex" 405).

The virtual assistant manager 305 processes 415 the spoken query, for example using natural language processing. When processing 415 the query, the virtual assistant manager 305 determines that the query 410 is addressed to a specific virtual assistant (e.g., the virtual assistant "Alex" 405). Additionally, the virtual assistant manager 305 identifies an information category (e.g., restaurants) to which the query 410 pertains. Note that the query 410 may require knowledge of the user's location in order to answer the spoken question. In one embodiment, the virtual assistant manager 305 determines the user's location.

Having processed the query, the virtual assistant manager 305 proceeds to poll 420 the addressed virtual assistant, here the "Alex" assistant 405. The virtual assistant manager 305 submits to the "Alex" assistant 405 the query 410 and any additional information needed to respond to the query (e.g., the location of the computing device 301).

In some embodiments, the virtual assistant manager 305 also selects 425 one or more additional virtual assistants to be polled with the query. Here, the virtual assistant manager 305 selects 425 both the first virtual assistant 310 and the second virtual assistant 315. Virtual assistant selection 425 may be as described above, e.g., based on the identified category, preferred virtual assistants, and the like. Having selected additional virtual assistants, the virtual assistant manager 305 polls 430 each of the selected virtual assistants (e.g., the first virtual assistant 310 and the second virtual assistant 315).

The polled virtual assistants 310-315, 405 then generate 435 responses to the query 330 and return 440 them to the virtual assistant manager 305. The virtual assistant manager 305 receives responses from the addressed "Alex" assistant 405 and the additionally selected virtual assistants 310-315. The virtual assistant manager 305 then proceeds to select 445 a first response to be presented to the user. Here, the first response is the response returned by the addressed "Alex" assistant 405.

The virtual assistant manager 305 controls an output device (e.g., speaker) of the computing device 301 to present 450 the first response along with an indicator of the responding virtual assistant. Here, the computing device 301 presents to the user 325 "ALEX suggests 'BRIO TUSCAN GRILLE'" with the indicator of the responding virtual assistant being the verbal indicator "ALEX suggests." In one embodiment, an audio logo may also be played as part of the indicator. In other embodiments, the virtual assistant manager 305 may control a display of the computing device 301 to display a name, logo, color, pattern, etc. associated with the "Alex" assistant 405.

In certain embodiments, the user 325 may desire another response. For example, the user 325 may be familiar with the suggested restaurant but may be looking for another option in the area. In response to the user 325 asking for another response, the virtual assistant manager 305 selects 455 a second response to the query. Response selection 455 may be as described above, e.g., based on a response quality score, preferred virtual assistants, and the like. Here, the virtual assistant manager 305 selects 455 the response "VIC'S RISTORANTE ITALIANO" from a virtual assistant named "CUISINE," which may be one of the first virtual assistant 310 and the second virtual assistant 315. In one embodiment, the virtual assistant manager 305 ensures that the second response is a different answer (e.g., names a different restaurant) than the first response.

Having selected the second response, the virtual assistant manager 305 controls the output device to present 460 the second response along with an indicator of the responding virtual assistant. Here, the computing device 301 presents to the user 325 "CUISINE suggests 'VIC'S RISTORANTE ITALIANO'." Here, the indicator of the responding virtual assistant is the verbal indicator "CUISINE suggests." In one embodiment, an audio logo may also be played as part of the indicator. In other embodiments, the virtual assistant manager 305 may control a display of the computing device 301 to display a name, logo, color, pattern, etc. associated with the virtual assistant "FORECASTER."

Figure 5:
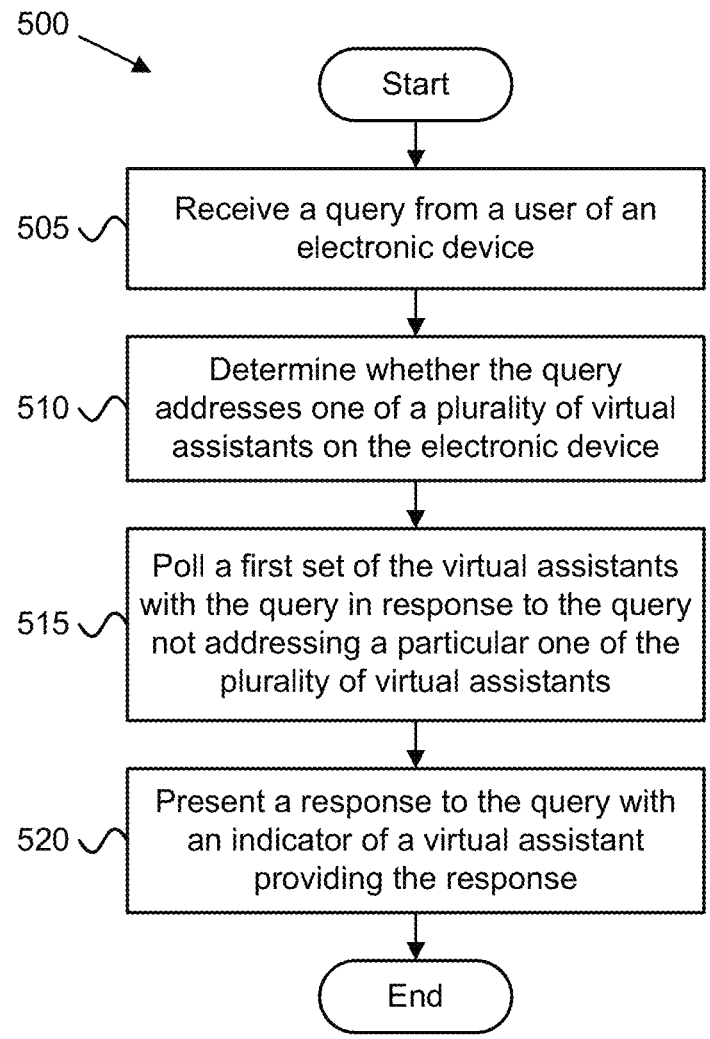
FIG. 5 is a schematic flow chart diagram illustrating one embodiment of a method for presenting a response to a query and indicating a responding virtual assistant from one of a plurality of virtual assistants.

FIG. 5 depicts a method 500 for presenting a response to a query and indicating a responding virtual assistant from one of a plurality of virtual assistants, according to embodiments of the disclosure. In some embodiments, the method 500 is performed using an electronic device, such as the electronic device 101, the virtual agent system 125, the virtual assistant manager 130, the apparatus 200, and/or the computing device 301, described above. In some embodiments, the method 500 is performed by a processor, such as a microcontroller, a microprocessor, a central processing unit (CPU), a graphics processing unit (GPU), an auxiliary processing unit, a FPGA, the processor 105, or the like.

The method 500 begins and receives 505 a query from a user of the electronic device (e.g., from a user of the electronic device 101). In some embodiments, the query is a spoken query. The user may deliver the spoken query by way of a voice command. Receiving 505 the query may include receiving a voice command and parsing said voice command to identify the spoken query. In one embodiment, the query is a request for information not stored at the electronic device 101 (e.g., not already within the memory 110).

The method 500 determines 510 whether the query addresses a particular one of a plurality of virtual assistants on the electronic device (e.g., one of the virtual assistants 135 on the electronic device 101). In some embodiments, determining 510 whether the query addresses a particular virtual assistant includes searching the query for a keyword associated with a specific virtual assistant 135. In one embodiment, the keyword associated with a specific virtual assistant 135 is a name of the virtual assistant 135.

The method 500 polls 515 a first set of the plurality of virtual assistants with the query in response to the spoken query not addressing a particular one of the plurality of virtual assistants. In some embodiments, polling 515 the first set of the plurality of virtual assistants includes identifying an information category to which the query belongs and selecting the first set of virtual assistant from those virtual assistants associated with the information category. In one embodiment, the query may belong to one of a plurality of predetermined categories. In another embodiment, the categories may be dynamic. Where a preferred virtual assistant is designated for the identified information category, polling 515 the first set of virtual assistants includes polling at least the preferred virtual assistant.

In certain embodiments, polling 515 the first set of virtual assistants includes waking (e.g., activating) the first set of virtual assistants. For example, the virtual assistants 135 may be in an inactive (e.g., sleep) state when not being polled or when not providing a response. In one embodiment, polling 515 the first set of virtual assistants includes submitting or forwarding the query (e.g., spoken query) to the first set of virtual assistants 135. The polled virtual assistants 135 may then process the query. In other embodiments, the virtual agent system 125 processes the query and passes the relevant query parameters (e.g., keywords, information category, etc.) to the first set of virtual assistants 135.

The method 500 presents 520 a response to the query along with an indicator of a virtual assistant providing the response ("responding virtual assistant"). In certain embodiments, presenting 520 the response with the indicator of the responding virtual assistant includes controlling an output device to present (e.g., sequentially or simultaneously) both the response to a query as well as an audio and/or visual indicator that corresponds to the responding virtual assistant. In some embodiments, presenting 520 the first response to the query and the indicator of the responding virtual assistant includes receiving a plurality of responses to the query from the first of virtual assistants and selecting a first response from among the received responses. Here, a response provided by a preferred virtual assistant for the identified category may be selected as the first response. Alternatively, the first response may be selected based on a highest response quality score ("RQS"). The method 500 ends.

Figure 6:
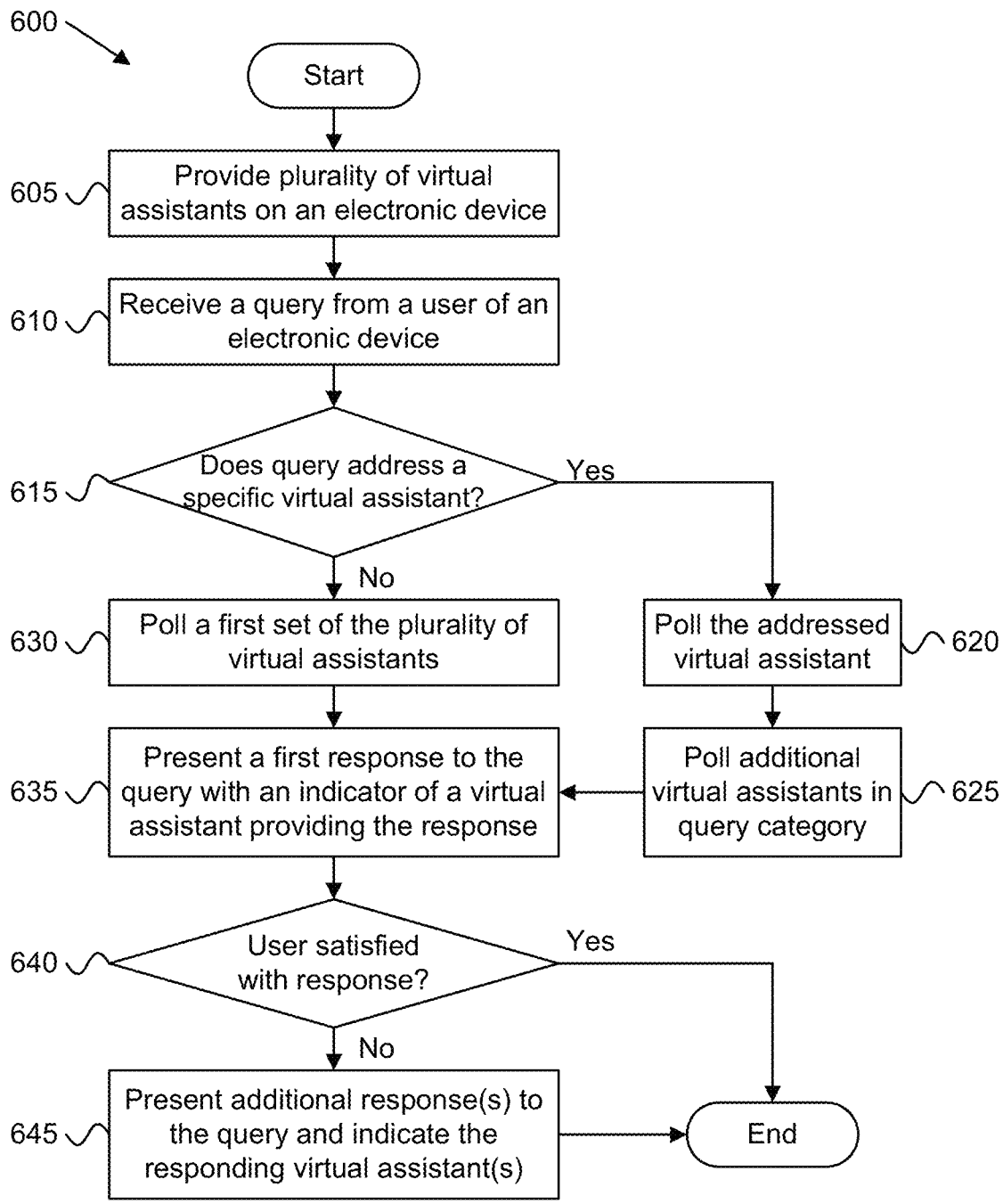
FIG. 6 is a schematic flow chart diagram illustrating another embodiment of a method for presenting a response to a query and indicating a responding virtual assistant from one of a plurality of virtual assistants.

FIG. 6 depicts a method 600 for presenting a response to a query and indicating a responding virtual assistant from one of a plurality of virtual assistants, according to embodiments of the disclosure. In some embodiments, the method 600 is performed using a computing device, such as the electronic device 101, the virtual agent system 125, the apparatus 200, and/or the computing device 301, described above. In some embodiments, the method 600 is performed by a processor, such as a microcontroller, a microprocessor, a central processing unit (CPU), a graphics processing unit (GPU), an auxiliary processing unit, a FPGA, or the like.

The method 600 begins and provides 605 a plurality of virtual assistants on an electronic device, such as the electronic device 101. In one embodiment, the virtual agent system 125 provides a plurality of virtual assistants 135 on the electronic device 101. Here, each virtual assistant 135 is capable of receiving a query (e.g., a spoken query) from the user and generating a response to the query. In certain embodiments, each virtual assistant 135 is produced by a different service provider. In one embodiment, the provided virtual assistant 135 may be a software client that communicates with a virtual assistant application 160 to generate the response. Here, a virtual assistant 135 may be supported by a server (e.g., a virtual assistant server 155) for computational resources (e.g., language processing, etc.) and/or data retrieval.

The method 600 includes receiving 610 a query from a user of the electronic device (e.g., from a user of the electronic device 101). In some embodiments, the query is a spoken query. Receiving 610 the query may include receiving a voice command and parsing said voice command to determine whether it includes a spoken query. In one embodiment, the query is a request for information not stored at the electronic device 101 (e.g., not already within the memory 110). The query may be addressed to a specific virtual assistant, may be addressed to the electronic device (in general), or may be unaddressed.

The method 600 includes determining 615 whether the query addresses a specific one of the virtual assistants provided on the electronic device. In some embodiments, determining 615 whether the query addresses a specific one of the virtual assistants includes searching the query for a keyword associated with a specific virtual assistant 135. In one embodiment, the keyword associated with a specific virtual assistant 135 is a name of the virtual assistant 135.

In response to the query addressing a specific virtual assistant, then the method 600 includes polling 620 the addressed virtual assistant and polling 625 at least one additional virtual assistant in the same category as the query. Otherwise, in response to the query not addressing a specific virtual assistant, then the method 600 includes polling 630 a first set of the plurality of virtual assistants.

In certain embodiments, polling 620 the addressed virtual assistant includes waking (e.g., activating) the addressed virtual assistant. For example, the virtual assistants 135 may be in an inactive (e.g., sleep) state when not being polled or when not providing a response. In one embodiment, polling 620 the addressed virtual assistant includes forwarding the query (e.g., spoken query) to the addressed virtual assistant 135. The addressed virtual assistant may then process the query. In other embodiments, the virtual agent system 125 processes the query and passes the relevant query parameters (e.g., keywords, information category, etc.) to the addressed virtual assistant 135.

In certain embodiments, polling 625 at least one additional virtual assistant in the same category as the query includes identifying an information category to which the query belongs. In one embodiment, the query may belong to one of a plurality of predetermined categories. In another embodiment, the categories may be dynamic. Polling 625 at least one additional virtual assistant in the same category as the query may further include selecting one or more unaddressed virtual assistants belonging to the identified category and polling only the selected virtual assistants. In some embodiments, a virtual assistant may be designated as a preferred virtual assistant for the identified information category. Here, polling 625 at least one additional virtual assistant in the same category as the query may include polling the preferred virtual assistant.

In some embodiments, polling 630 a first set of the plurality of virtual assistants includes identifying an information category to which the query belongs. Here, the first set includes one or more virtual assistants associated with the identified information category. Where a preferred virtual assistant is designated for the identified information category, polling 630 a first set of virtual assistants includes polling at least the preferred virtual assistant. Polling 630 the first set of virtual assistants may include waking/activating the first set of virtual assistants and passing them the query (or query parameters).

The method 600 includes presenting 635 a first response to the query along with an indicator of a virtual assistant providing the first response ("responding virtual assistant"). In certain embodiments, presenting 635 the first response along with the indicator of the responding virtual assistant includes controlling an output device to present (e.g., sequentially or simultaneously) both the response to a query as well as an audio and/or visual indicator that corresponds to the responding virtual assistant. In some embodiments, presenting 635 the first response to the query and the indicator of the responding virtual assistant includes receiving a plurality of responses to the query from a plurality of virtual assistants.

Where the query was addressed to a specific virtual assistant, presenting 635 the first response includes presenting the response provided by the addressed virtual assistant along with an audio and/or visual indicator of the addressed virtual assistant. Where the query did not address a specific virtual assistant, presenting 635 the first response includes selecting a first response from among the received responses. Here, a response provided by a preferred virtual assistant for the identified category may be selected as the first response. Alternatively, the first response may be selected based on a highest response quality score ("RQS").

The method 600 includes determining 640 whether the user is satisfied with the first response. In some embodiments, determining 640 whether the user is satisfied with the first response includes listening for a keyword or phrase indicating that the user is not satisfied with the response. In certain embodiments, determining 640 whether the user is satisfied with the first response includes determining whether a query received within a predetermined amount of time from when the first response was provided is closely related to the earlier query.

In response to the user being satisfied with the first response, the method 600 ends. Otherwise, the method 600 includes presenting 645 at least one additional response to the query along with indicator(s) of the responding virtual assistant(s) and the method 600 ends.

In some embodiments, presenting 645 at least one additional response to the query along with indicator(s) of the responding virtual assistant(s) includes selecting another response having a (next) highest RQS. Where the first response was provided by the addressed virtual assistant, presenting 645 at least one additional response to the query may include selecting a response from a preferred virtual assistant for the query's identified category. Where the first response was provided by the preferred virtual assistant, presenting 645 at least one additional response to the query may include selecting a response from another polled virtual assistant whose response has a RQS above a threshold amount.

In certain embodiments, presenting 645 at least one additional response to the query may include selecting a response that is different than the first response. Alternatively, presenting 645 at least one additional response to the query may include indicating that other polled virtual assistants report the same response as the first response. In response to the user desiring a third (or more) opinion, presenting 645 at least one additional response to the query may include selecting additional responses from the plurality of received responses.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
   a processor of an electronic device; and
   a memory of the electronic device that stores code executable by the processor to:
      receive a spoken query from a user of an electronic device;
      determine whether the spoken query addresses a particular virtual assistant of a plurality of virtual assistants utilized by the electronic device;
      poll a first set of the plurality of virtual assistants with the spoken query in response to the spoken query not being addressed to any particular virtual assistant of the plurality of virtual assistants, the first set of the plurality of the virtual assistants comprising two or more virtual assistants of the plurality of virtual assistants;
      receive a first response from at least one virtual assistant of the first set of the virtual assistants;
      obtain a response quality score ("RQS") for the first response received from the polled at least one virtual assistant of the first set of virtual assistants, the RQS comprising a metric by which a likelihood of the first response being satisfactory is predicted; and
      present, to the user, the first response to the spoken query in response to the first response having an RQS that satisfies a response quality threshold ("RQT") while continuing to receive responses to the spoken query from other virtual assistants of the polled first set of virtual assistants for use as subsequent responses in response to the subsequent responses having RQSs that satisfy the RQT, the first response and each subsequent response comprising an indicator identifying a virtual assistant providing the respective response.

2. The apparatus of claim 1, wherein the processor further:
   associates each of the plurality of virtual assistants utilized by the electronic device to at least one information category of a plurality of information categories; and
   identifies a query category for the spoken query, the query category being an information category of the plurality of information categories,
   wherein polling the first set of the virtual assistants with the spoken query comprises the processor submitting the spoken query to each virtual assistant associated with the information category matching the identified query category.

3. The apparatus of claim 2, wherein the processor further:
   polls an addressed virtual assistant with the spoken query in response to the spoken query addressing the particular virtual assistant of the plurality of virtual assistants;
   polls at least one unaddressed virtual assistant matching the identified query category with the spoken query; and
   receives a second response to the spoken query from the addressed virtual assistant.

4. The apparatus of claim 3, wherein the processor further:
   receives an indication of the user being unsatisfied with the first response and/or the second response; and
   presents, to the user, a third response to the spoken query with the respective indicator identifying an unaddressed virtual assistant providing the third response, the third response being received from an unaddressed virtual assistant associated with the identified query category corresponding to the spoken query,
   wherein the respective indicator identifies the virtual assistant providing the third response and includes one of: an audio indicator or a visual indicator.

5. The apparatus of claim 2, wherein the processor further:
   determines whether one of the plurality of virtual assistants is a preferred virtual assistant for the information category matching the query category,
   wherein presenting a particular response to the spoken query comprises the processor presenting the particular response received from the preferred virtual assistant matching the information category in response to determining that the one of the plurality of virtual assistants is the preferred virtual assistant for the information category.

6. The apparatus of claim 1, wherein the processor further:
   receives a plurality of subsequent responses to the spoken query from the first set of the virtual assistants;
   receives an indication of the user being unsatisfied with the first response;
   selects a subsequent response from the received plurality of subsequent responses; and
   presents the subsequent response with the respective indicator identifying an unaddressed virtual assistant providing the subsequent response, the respective indicator identifying the unaddressed virtual assistant providing the subsequent response being one of: an audio indicator or a visual indicator.

7. The apparatus of claim 1, wherein determining whether the spoken query addresses the particular virtual assistant of the plurality of virtual assistants utilized by the electronic device comprises the processor:
   receiving a list of trigger words associated with the plurality of virtual assistants, each trigger word corresponding to one of the plurality of virtual assistants; and
   determining whether the spoken query includes a trigger word from the list of trigger words corresponding to the particular virtual assistant.

8. A method comprising:
   receiving, by use of a processor, a query from a user of an electronic device;
   determining whether the query addresses a particular virtual assistant of a plurality of virtual assistants utilized by the electronic device;
   polling a first set of the plurality of virtual assistants with the query in response to the query not being addressed to any particular virtual assistant of the plurality of virtual assistants, the first set of the plurality of the virtual assistants comprising two or more virtual assistants of the plurality of virtual assistants;

receiving a first response from at least one virtual assistant of the first set of the virtual assistants;

obtaining a response quality score ("RQS") for the first response received from the polled at least one virtual assistant of the first set of virtual assistants, the RQS comprising a metric by which a likelihood of the first response being satisfactory is predicted; and presenting, to the user, the first response to the spoken query in response to the first response having an RQS that satisfies a response quality threshold ("RQT") while continuing to receive responses to the spoken query from other virtual assistants of the polled first set of virtual assistants for use as subsequent responses in response to the subsequent responses having RQSs that satisfy the RQT, the first response and each subsequent response comprising an indicator identifying a virtual assistant providing the respective response.

9. The method of claim 8, further comprising:
associating each of the plurality of virtual assistants utilized by the electronic device to at least one information category of a plurality of information categories; and identifying a query category for the query, the query category being an information category of the plurality of information categories, wherein polling the first set of the virtual assistants with the query comprises submitting the query to each virtual assistant associated with the information category matching the query category.

10. The method of claim 9, further comprising:
polling an addressed virtual assistant with the query in response to the query addressing the particular virtual assistant of the plurality of virtual assistants;

polling at least one unaddressed virtual assistant matching the identified query category with the query; and receiving a second response to the query from the addressed virtual assistant.

11. The method of claim 10, further comprising:
receiving an indication of the user being unsatisfied with the first response and/or the second response, wherein the query is a spoken query and the indication of the user being unsatisfied is a verbal indication; and presenting, to the user, third response to the query with the respective indicator identifying an unaddressed virtual assistant providing the third response, the third response being received from an unaddressed virtual assistant matching the identified query category with the query, wherein the respective indicator identifies the virtual assistant providing the third response and includes one of: an audio indicator or a visual indicator.

12. The method of claim 9, further comprising:
determining whether one of the plurality of virtual assistants is a preferred virtual assistant for the information category matching the query category, wherein presenting a particular response to the query comprises presenting the particular response received from the preferred virtual assistant matching information category in response to determining that the one of the plurality of virtual assistants is the preferred virtual assistant for the information category.

13. The method of claim 8, the method further comprising:
receiving a plurality of subsequent responses to the query from the first set of the virtual assistants;

receiving an indication of the user being unsatisfied with the first response;

selecting a subsequent response from the received plurality of subsequent responses; and presenting the subsequent response with the respective indicator identifying an unaddressed virtual assistant providing the subsequent response, the respective indicator identifying the unaddressed virtual assistant providing the subsequent response being one of: an audio indicator or a visual indicator.

14. The method of claim 8, wherein receiving the responses to the query from other virtual assistants of the polled first set of virtual assistants for use as subsequent responses in response to the subsequent responses having RQSs that satisfy the RQT comprises:
receiving a plurality of subsequent responses to the query from the first set of the virtual assistants;

determining a respective RQS for each subsequent response of the received plurality of subsequent responses;

comparing each RQS for the received plurality of subsequent responses to the RQT; and selecting a subsequent response of the plurality of subsequent responses having the respective RQS above the RQT.

15. The method of claim 14, wherein selecting one of the plurality of responses having the respective RQS above the RQT comprises selecting an earliest received subsequent response having a an RQS above the RQT.

16. The method of claim 14, further comprising:
identifying a query category for the query, the query category being an information category of a plurality of information categories;

identifying, for each information category of the plurality of information categories, a virtual assistant from among the plurality of virtual assistants providing a highest number of responses having a respective RQS above the RQT; and designating, for each information category of the plurality of information categories, the identified virtual assistant as a preferred virtual assistant for that information category, wherein selecting one of the plurality of responses having a respective RQS above the RQT comprises selecting a response received from the preferred virtual assistant for the information category matching the query category.

17. A program product comprising a computer-readable storage medium that stores code executable by a processor, the executable code comprising code to perform:
receive a query from a user of an electronic device;

determine whether the query addresses a particular virtual assistant of a plurality of virtual assistants utilized by the electronic device;

poll a first set of the plurality of virtual assistants with the query in response to the query not being addressed to any particular virtual assistant of the plurality of virtual assistants, the first set of the plurality of the virtual assistants comprising two or more virtual assistants of the plurality of virtual assistants;

receive a first response from at least one virtual assistant of the first set of the virtual assistants;

obtain a response quality score ("RQS") for the first response received from the polled at least one virtual assistant of the first set of virtual assistants, the RQS comprising a metric by which a likelihood of the first response being satisfactory is predicted; and present, to the user, the first response to the query in response to the first response having an RQS that satisfies a response quality threshold ("RQT") while continuing to receive responses to the query from other virtual assistants of the polled first set of virtual assistants for use as subsequent responses in response to the subsequent responses having RQSs that satisfy the RQT, the first response and each subsequent response comprising an indicator identifying a virtual assistant providing the respective response.

18. The program product of claim 17, wherein receiving the responses to the query from other virtual assistants of the polled first set of virtual assistants for use as subsequent responses in response to the subsequent responses having RQSs that satisfy the RQT comprises:
  receiving a plurality of subsequent responses to the query from the first set of the virtual assistants, wherein the query is a spoken query;
  determining a respective RQS for each subsequent response of the received plurality of subsequent responses;
  comparing each RQS for the received plurality of subsequent responses to the RQT; and
  selecting a subsequent response of the plurality of responses having the respective RQS above the RQT.

19. The program product of claim 18, wherein selecting the subsequent response of the plurality of responses having the respective RQS above the RQT comprises selecting an earliest RQT.

20. The program product of claim 18, further comprising:
  identifying a query category for the query, the query category being an information category of a plurality of information categories;
  identifying, for each information category of the plurality of information categories, a virtual assistant from among the plurality of virtual assistants providing a highest number of responses having a respective RQS above the RQT; and
  designating, for each of the plurality of information categories, the identified virtual assistant as a preferred virtual assistant for that information category,
  wherein selecting one of the plurality of responses having a response quality score above the response quality threshold comprises selecting a response received from the preferred virtual assistant for the information category matching the query category.

* * * * *